(12) United States Patent
Satoh

(10) Patent No.: US 7,136,531 B2
(45) Date of Patent: Nov. 14, 2006

(54) IMAGE ENCODER, IMAGE ENCODING METHOD, IMAGE ENCODING COMPUTER PROGRAM, AND STORAGE MEDIUM

(75) Inventor: Makoto Satoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 754 days.

(21) Appl. No.: 10/409,154

(22) Filed: Apr. 9, 2003

(65) Prior Publication Data
US 2003/0202582 A1 Oct. 30, 2003

(30) Foreign Application Priority Data
Apr. 9, 2002 (JP) .............................. 2002-106910

(51) Int. Cl.
*G06K 9/36* (2006.01)
(52) U.S. Cl. ...................... 382/232; 382/239; 382/251
(58) Field of Classification Search ................ 382/232, 382/233, 239, 251; 375/240.03, 240.05, 375/240.25, 240.24, 240.18; 358/400, 1.9, 358/445; 348/405.1, 515; 709/247
See application file for complete search history.

(56) References Cited

U.S. PATENT DOCUMENTS

| | | | | |
|---|---|---|---|---|
| 5,291,282 A | | 3/1994 | Nakagawa et al. ........ | 348/384 |
| 5,371,606 A | * | 12/1994 | Katayama et al. ......... | 358/400 |
| 5,543,844 A | | 8/1996 | Mita et al. .................. | 348/405 |
| 5,758,092 A | * | 5/1998 | Agarwal ..................... | 709/247 |
| 6,310,915 B1 | * | 10/2001 | Wells et al. ............ | 375/240.03 |
| 6,968,012 B1 | * | 11/2005 | Meggers ................. | 375/240.24 |
| 2002/0122599 A1 | | 9/2002 | Igarashi et al. ............. | 382/239 |
| 2003/0002743 A1 | | 1/2003 | Ohta et al. .................. | 382/239 |
| 2003/0043905 A1 | | 3/2003 | Nakayama et al. ..... | 375/240.04 |

FOREIGN PATENT DOCUMENTS

| | | |
|---|---|---|
| JP | 2-100487 | 4/1990 |
| JP | 2523953 | 3/1992 |
| JP | 3038022 | 8/1992 |
| JP | 2897563 | 6/1994 |
| JP | 8-32037 | 3/1996 |

* cited by examiner

*Primary Examiner*—Anh Hong Do
(74) *Attorney, Agent, or Firm*—Fitzpatrick, Cella, Harper & Scinto

(57) ABSTRACT

An image encoder of the present invention includes an encoder unit for generating first encoded data, re-encoder unit for re-encoding the first encoded data to generate second encoded data, parameter updating unit for updating of the encoder unit when the sum of data amount of the first and second encoded data reaches a target amount, and controller for starting a re-encoding process when the sum reaches the target amount. The encoder unit encodes still unencoded image data using all encoding parameters that are updated from the parameter that has been used at the beginning of the encoding of the source image data. The image encoder thus encodes image data into data having a desired data amount on a substantial real-time basis. When the encoded data is decoded, non-uniformity in image quality of the decoded image due to different numbers of encoding and decoding operations is controlled.

12 Claims, 13 Drawing Sheets

RELATIVE POSITION OF ENCODED BLOCK

FIG. 8

| 16 | 11 | 10 | 16 | 24 | 40 | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG. 9B

| 11 | 8 | 9 | 9 | 12 | 16 | 32 | 48 |
|---|---|---|---|---|---|---|---|
| 7 | 8 | 9 | 11 | 15 | 23 | 42 | 61 |
| 7 | 9 | 11 | 15 | 24 | 36 | 51 | 63 |
| 11 | 13 | 16 | 19 | 37 | 42 | 57 | 63 |
| 16 | 17 | 26 | 34 | 45 | 53 | 68 | 74 |
| 26 | 38 | 38 | 57 | 72 | 69 | 80 | 66 |
| 34 | 40 | 46 | 53 | 68 | 75 | 79 | 68 |
| 40 | 36 | 37 | 41 | 51 | 61 | 67 | 65 |

FIG. 9A

| 7 | 5 | 6 | 6 | 8 | 10 | 21 | 30 |
|---|---|---|---|---|---|---|---|
| 5 | 5 | 5 | 7 | 9 | 15 | 27 | 39 |
| 4 | 6 | 7 | 9 | 16 | 23 | 33 | 40 |
| 7 | 8 | 10 | 12 | 24 | 27 | 37 | 41 |
| 10 | 11 | 17 | 21 | 29 | 34 | 43 | 47 |
| 17 | 24 | 24 | 37 | 46 | 44 | 51 | 42 |
| 21 | 25 | 29 | 34 | 43 | 47 | 50 | 43 |
| 26 | 23 | 24 | 26 | 32 | 39 | 42 | 42 |

IMAGE ENCODER, IMAGE ENCODING METHOD, IMAGE ENCODING COMPUTER PROGRAM, AND STORAGE MEDIUM

BACKGROUND OF THE INVENTION

1. Field of the Invention

The present invention relates to a control technique in an encoding process for encoding digital image data to convert the digital image data into encoded data having a predetermined data amount.

2. Description of the Related Art

A number of apparatuses are equipped with the function of compression encoding a still image. Digital cameras are available as a typical example of such apparatuses. Many digital copying apparatuses have also the function of compression encoding.

In such a digital copying apparatus, a document reader reads an original document and image using an optical sensor or the like, and source image data is reproduced by performing a diversity of image processes.

When the source image data is transferred to a printer, the amount of data to be transferred is reduced. The document reader is thus provided with the function of compression encoding the source image data.

On the other hand, the printer is provided with the function of decompression decoding for decoding an encoded data stream.

The amount of data of the encoded data stream obtained through the compression encoding process is typically smaller than a fraction of the amount of the image data prior to the compression coding process, i.e., a fraction of the amount of the source image data.

It is preferred that a distortion due to the compression encoding (an image degradation) is as small as a value (a compression rate) that cannot be easily recognized from reconstructed image data (a decoded image) obtained through a decompression decoding process. That value is preferably adopted as an upper limit of the compression rate.

A lower limit permitted as the compression rate depends on factors, such as the maximum amount of source image data formed by the document reader per predetermined unit time, and the maximum amount of encoded data transferred from the document reader to the printer, namely, the performance of the processing system.

The upper limit and lower limit of the compression rate, namely, a permissible range of the compression rate, is thus determined. However, it is extremely difficult to restrict in practice the compression rate of the source image data formed in the document reader to within the permissible range.

Even if the same quantization table affecting the compression rate is used to compression encode the source image data of the same size, the amount of the resulting encoded data becomes different from source image data to source image data. In other words, the source image data changes depending on the content of the image.

To maintain the compression rate at a constant value, an encoding parameter (such as a quantization table) must be modified to an appropriate value each time each source image data is compressed.

Two techniques, a feed-forward method and feedback method, are available to control the compression rate (the amount of encoded data).

In the feed-forward method, the source image data, input as data to be encoded, is analyzed prior to compression encoding, an encoding parameter is estimated based on the analysis result, and compression encoding is performed using the parameter.

In the feed-back method, a trial compression encoding process is performed using a predetermined encoding parameter, an appropriate encoding parameter is estimated based on the amount of the resulting encoded data, and an actual compression encoding process is performed using the estimated parameter.

The latter feedback method achieves a target encoded data amount with a probability higher than the feed-forward method because the feedback method uses the actual data amount of encoded data.

The feedback method needs more time because of the trial compression encoding thereof.

Japanese Patent Laid-Open No. 02-100487 (Japanese Patent Publication No. 08-032037) discloses a technique which repeats a compression encoding process until a target compression rate (encoded data amount) results. Real-time processing is not considered in this disclosure.

Real-time processing is typically required of apparatuses, such as a digital camera or a digital copying apparatus. The above-mentioned simple repetition process is not appropriate for these apparatuses.

An optimum encoding parameter must be precisely predicted in the feedback method that controls the compression rate (the encoded data amount). To this end, a plurality of trial compression encoding processes are performed by several times using a plurality of different encoding parameters. It is effective if the number of combinations of the encoding parameter in use and the data amount of the encoded data (actually measured value) corresponding to the encoding parameter is increased. To minimize extra time required to predict the parameter, calculation circuits or processing circuits, of the same number as the number of encoding parameters used in the trial compression encoding, must be arranged. The circuits are run in parallel to shorten prediction time.

An article entitled "HDTV CODER/DECODER COMPATIBLE WITH 60–140 MBPS" 1992 January Issue of Journal of Imaging and Information Technology discloses a compression coder which includes N quantizers and N measurement circuits for measuring amount of generated codes, and uses N combinations of quantization tables. An optimum quantization table is obtained by using a curve fitting based on the amount of N pieces of encoded data.

Japanese Patent No. 02523953 discloses a technique which uses three quantizers and performs quantization in parallel using five combinations of quantization tables during a trial compression coding, and thus calculates five values of encoded data amount.

An encoding method for successively encoding image data by dynamically changing the scaling factor for a quantization table, namely, a motion image compression coding method using a so-called MPEG may be used to compression encode a single piece of image data. U.S. Pat. No. 5,543,844 (corresponding to Japanese Patent No. 02897563) discloses such an encoding method and uses a successive correction algorithm for an encoding parameter. In this disclosed technique, the amount of encoded data obtained block by block from quantization calculation using a particular quantization scaling factor is measured. M encoded data amounts expected to be obtained from M quantization scaling factors based on the measured data amount are predicted. A quantization scaling factor to be actually used is successively corrected based on a predicted error, namely, a difference between a target encoded data amount calculated from M predictive values and a cumulative value of data amount of an encoded data stream actually output up until now. A compression coding is thus performed on a single frame.

U.S. Pat. No. 5,291,282 (corresponding to Japanese Patent No. 03038022) discloses a technique which prevents an encoded data amount from exceeding a permitted upper limit against prediction. A quantization step value determined from an encoded data amount that is obtained in an trial compression encoding process is used. When the encoded data amount that is obtained through a quantization calculation and variable-length coding process exceeds a data amount assigned to each block, the variable-length coding process in that block is quit (effective transform coefficient information is discarded).

The control methods of the compression rate (the encoded data amount) using the above-mentioned conventional type feed-back method are common in that an optimum encoding parameter and a data amount of encoded data generated through the encoding process using the optimum encoding parameter are estimated based on one or a plurality of pieces of encoded data obtained through a trial compression encoding (actual measured value).

In the JPEG encoding method which is a typical still image compressing encoding method, it is regulated that "a single quantization table is commonly applied to all blocks constituting a single piece of source image data" when a quantization table as the most typical encoding parameter is applied.

The technique of selecting an encoding parameter disclosed in U.S. Pat. No. 5,543,844 cannot be applied if there is a requirement that a compression encoding method with the freedom of selecting an encoding parameter limited be adopted, as in the above-mentioned JPEG.

In the algorithm disclosed in U.S. Pat. No. 5,291,282, it is determined whether or not a data amount assigned to each block is exceeded on a block by block basis. A variable-length coding is quit on a block by block basis. An effective orthogonal transform coefficient is discarded even if a final encoded data amount does not reach the upper permissible value when the compression coding of all blocks constituting the source image data is completed. As a result, a decoded image suffers from a localized distortion on a per block basis.

When the feed-back method having a high prediction accuracy is used, a conventional type parallel circuit architecture proves effective in a variety of apparatuses, of which real-time processing is required. However, the scale of the circuitry becomes large. A capacity of buffers which temporarily store a plurality of encoded data streams must be large, leading to a cost increase.

When the compression encoding process is performed on the still image on each of the above-discussed apparatuses, a difference in localized encoding distortion from one to another piece of the source image data (a visual image degradation) must be avoided.

In many cases, the encoding distortion is caused by quantization calculation. The JPEG coding scheme does not allow different quantization tables to be used on a block by block basis. Conversely, this constraint provides the advantage that the source image data is free from localized encoding distortion.

For this reason, the JPEG coding scheme is frequently used as a still image compression coding method in a digital camera or digital copying apparatus which handles a still image.

It is a good choice that a "re-encoding process function" is applied to perform a compression coding at a target compression rate with a high performance maintained in an apparatus that adopts "the compression encoding method with the freedom of selecting an encoding parameter limited" as in the above-mentioned JPEG.

A number of application methods of the "re-encoding process function" are available. The function and advantages of the re-encoding process become different depending on what status of the image data the re-encoding process is performed.

In the middle of the compression encoding of the single source image data (from the beginning of the encoding to the formation of final encoded data), the source image data itself or orthogonal transform coefficients prior to quantization are temporarily stored in a buffer. A technique of performing a re-encoding process using stored source image data or the orthogonal transport coefficient is known. However, this technique requires a large buffer capacity.

SUMMARY OF THE INVENTION

The inventors of this invention have invented a technique that provides a re-encoding process more effective than the conventional art. An encoded data stream corresponding to one area already compression encoded in source image data is stored in a buffer. The encoded data stream is read when the re-encoding process is required, and temporarily decoded. After the decoded data is re-encoded using a new encoding parameter (or after a conversion process similar to the decoding and re-encoding process is performed), the newly obtained encoded data stream is substituted for (adopted instead of) the read encoded data stream.

The preset invention has been developed in view of the conventional art, and it is an object of the present invention provide a compression encoding technique presenting a real-time feature in the process of encoding image data into data having a desired data amount.

It is another object of the present invention to provide a technique that presents a uniform image quality in an entire decoded image when encoded data is decoded and reproduced, more specifically, to provide a technique that prevents an image quality from being different regardless of a different number of times of compression and decompression repeated in each area of an image.

An image encoder of the present invention includes an encoding unit which encodes source image data using an encoding parameter to generate first encoded data, a re-encoding unit which re-encodes the first encoded data using a re-encoding parameter to generate second encoded data, a parameter updating unit which calculates a new parameter for the encoding unit and feeds the new encoding parameter to the encoding unit when a sum of a data amount of the first encoded data and a data amount of the second encoded data reaches a target amount, and a controller which feeds a re-encoding parameter for the re-encoding unit and starts a re-encoding process when the sum of data amount reaches the target amount, wherein the encoding unit performs an encoding process using the encoding parameter at the beginning of encoding the source image data and all encoding parameters which are updated versions of the scaling parameter.

Further objects, features, and advantages of the present invention will be apparent from the following description of the preferred embodiments with reference to the attached drawings.

BRIEF DESCRIPTION OF THE DRAWINGS

FIG. 8 diagrammatically illustrates quantization step values in a matrix form.

FIGS. 9A and 9B diagrammatically illustrate scaled quantization step values in a matrix form.

DESCRIPTION OF THE PREFERRED EMBODIMENTS

Figure 1:
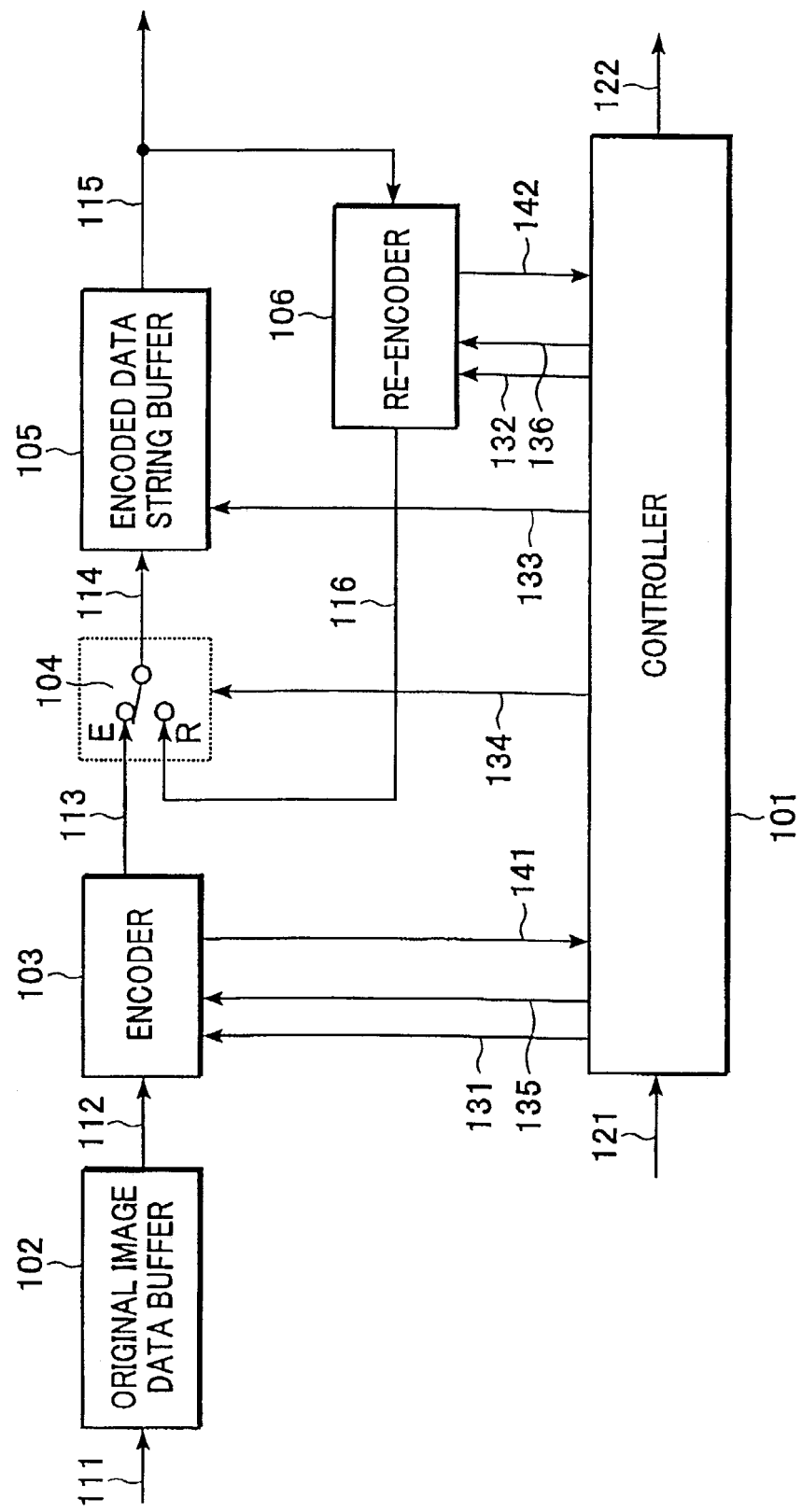
FIG. 1 is a block diagram illustrating an image encoder incorporating the present invention.

The embodiments of the present invention are discussed below.

A compression encoding process in an image encoder incorporating the present invention will be discussed first.

The duration of time of the image encoder of the present invention for performing a series of compression coding steps on a single source image (corresponding to image data representing one page of a document in this embodiment) is divided two major process phases: an encoding process phase and re-encoding process phase.

A series of compression encoding steps on the single source image must start with the encoding process phase, and includes one or a plurality of re-encoding process phases in the middle of the process. The number of re-encoding process phases is determined depending on whether a target compression rate of the re-encoding process is achieved at that number of re-encoding process steps.

In the encoding process phase, the encoder in the image encoder apparatus successively performs an encoding process on the source image data on a per rectangular block, the rectangular block having a predetermined size. An encoding parameter currently in use is provided by the controller in the image encoder at the beginning of the encoding process phase.

Individual encoded data streams corresponding to the source image data in rectangular blocks generated by the encoder during the encoding process phase are successively stored in an encoded data stream buffer, while the controller is notified of associated information such as a data amount.

The encoded data stream buffer temporarily stores an encoded data stream which could be output from the image encoder implementing the present invention as final results of a series of compression encoding steps. The encoded data stream buffer also temporarily stores an encoded data stream which is fed to a re-encoder to be discussed later, during a re-encoding process phase.

The controller accumulates and calculates individual encoded data amounts notified of by the encoder. The controller compares the cumulative value with a target encoded data amount separately calculated from a maximum permissible encoded data amount set beforehand by an external system as necessary.

In accordance with a predetermined determination criterion based on the comparison results, the controller determines whether to continue the encoding process on subsequent source image data (still unencoded image data) using a current encoding parameter or to perform the encoding process using a new encoding parameter to heighten a compression rate.

If it is determined that the encoding parameter needs to be updated, the controller calculates a new encoding parameter based on the associated information notified of by the encoder in response to the source image data in unit rectangular blocks.

With an update value of the encoding parameter calculated, before starting an encoding process on subsequent rectangular blocks of the source image (an area of the unencoded image of the one page) using the new encoding parameter, the controller performs a transition to a re-encoding process phase and controls operation relating to the transition to perform a re-encoding process on the individual encoded data streams corresponding to rectangular blocks already encoded (areas of the image of one page at least encoded one time).

During the re-encoding process phase, the re-encoder successively performs the re-encoding process on the individual encoded data streams that are stored in the encoded data stream buffer during the preceding encoding process phase. An re-encoding parameter in use is provided by the controller in the image encoder at the beginning of the re-encoding process phase.

During the re-encoding process phase, the operation of the encoder (for an encoding step for a still unencoded area of the image on the page) is suspended.

The individual data streams (an area of the image on the page encoded at least one time) fed to the re-encoder during the re-encoding process phase are successively replaced in the encoded data stream buffer with the encoded data stream generated by the re-encoder. The controller is notified of associated information such as a new data amount.

The controller accumulates and calculates individual encoded data amounts notified of by the encoder.

When the re-encoding process to all encoded data generated during the preceding encoding process phase is completed, the operation phase of the image encoder reverts from the re-encoding process phase to the encoding process phase (for an encoding step for encoding an unencoded area of the image within the one page).

In the image encoder now in the encoding process phase, the controller commands the encoder to update the encoding parameter, and then releases the encoder from the suspension state. In response, the encoding process to a subsequent rectangular block of the source image data resumes. The updated encoding parameter is now used.

When the encoding process carried out by the encoder succeeds to the preceding re-encoding process phase, the encoding process is performed referencing not only the updated latest encoding parameter but also "all encoding parameters" applied in the preceding encoding process phase.

If the encoding process carried out by the encoder is performed referencing the updated latest encoding parameter only, the number of re-encoding processes (the number of quantization and dequantization) becomes different from area to area within the one page. If the entire image of the decoded one page is viewed, a border between image qualities occurs in an area where an encoding parameter switching takes place. There is a possibility that a visual degradation is generated.

To avoid this problem, all encoding parameters are referenced in the encoding process of the encoder. The encoder generates the encoded image data that is encoded through a process identical to the re-encoding process which the preceding encoded area underwent.

The individual data streams (the unencoded data of the image within the page) corresponding to the source image data in the unit block to be generated during the encoding process phase in succession to the re-encoding process phase are successively stored in succession to the re-encoded data streams already stored in the encoded data stream buffer so that the encoded image data of the one pate is formed in a correct order. The controller is notified of the data amount of the encoded data stream each time the stream is stored.

The encoding process is performed on the image data in all unit rectangular blocks constituting the one page while the re-encoding process phase is interposed between the encoding process phases at the same time as necessary. The image encoder apparatus converts all encoded data streams stored in the encoded data stream buffer into the continuous encoded data of the one page having a target code amount. Control of these steps are performed on a real-time basis.

One feature of this embodiment is that an applicable encoding parameter is common to all areas when the image data of one document (the document of one page in this embodiment) is encoded. Specifically, if the controller determines in the middle of the encoding of the document that a different parameter appropriate for the remaining image (an unencoded area) is present, the remaining image is encoded using the different parameter. The encoded data of the encoded image area is directly converted as the data which is encoded in the re-encoding process (or an equivalent process) using the "different" encoding parameter. The converted data is then substituted for the encoded data of the encoded image area. The present embodiment meets the constraint of the JPEG encoding method (of one encoding parameter for one image), and generates the encoded data in the target code amount. The present invention is not necessarily limited to the JPEG encoding method. The present invention is applicable to a technique which encodes an image on an area by area basis. For example, the present invention is applicable to the JPEG 2000 (to encode an image on a tile by tile basis).

Another feature of this embodiment is that the number of and type of applicable encoding parameters are set to be common to all areas when the image data of one document (the document of one page in this embodiment) is encoded. Specifically, when a re-encoding process is performed on a given area, the same image quality adjustment is carried out on the remaining areas (this may be an intentional image degradation process). However, this arrangement eliminates a visual discord when the entire image is viewed.

The drawings related to this embodiment are first discussed.

FIG. 1 is a functional block diagram illustrating the embodiment of the image encoder implementing the present invention. The embodiment is applied to the JPEG method, although the present invention is not limited to the JPEG compression.

As shown, the image encoder includes a controller 101, source image data buffer 102, encoder 103, switch 104, encoded data stream buffer 105, re-encoder 106, source image data input signal line 111, data input signal line 112, first encoded data stream signal line 113, selected encoded data stream signal line 114, encoded data stream buffer read signal line 115, second encoded data stream signal line 116, compression encoding start request signal line 121, compression encoding end notification signal line 122, encoding operation control signal line 131, re-encoding operation control signal line 132, encoded data stream buffer control signal line 133, process phase designating signal line 134, encoding parameter designating signal line 135, re-encoding parameter designating signal line 136, encoding process associated information notification signal line 141, and re-encoding process associated information notification signal line 142.

Figure 2:
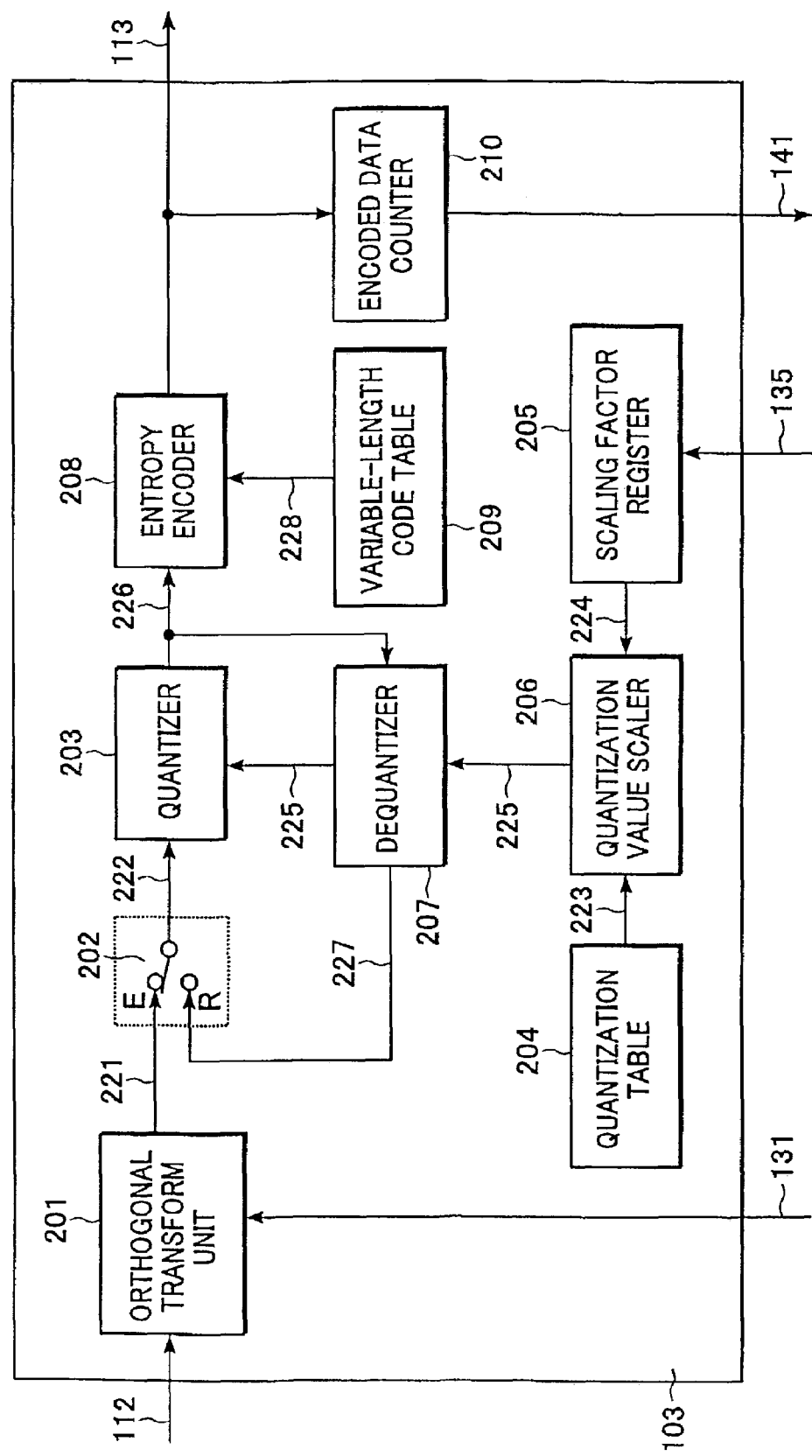
FIG. 2 is a block diagram illustrating an encoder of a first embodiment of the present invention.

FIG. 2 is a functional block diagram illustrating the construction of the encoder 103 in the image encoder illustrated in FIG. 1.

As shown, the encoder 103 includes an orthogonal transform unit (discrete cosine transform unit) 201, switch 202, quantizer 203, quantization table 204, scaling factor register 205, quantization value scaler 206, dequantizer 207, entropy encoder (Huffman encoder) 208, variable-length code table (Huffman table) 209 for encoding, encoded data counter 210, transform coefficient matrix signal line 221, selected transform coefficient matrix signal line 222, quantization step signal line 223, scaling signal line 224, scaled quantization step signal line 225, quantized transform coefficient matrix signal line 226, dequantized transform coefficient matrix signal line 227, and variable-length encoding signal line 228.

Figure 3:
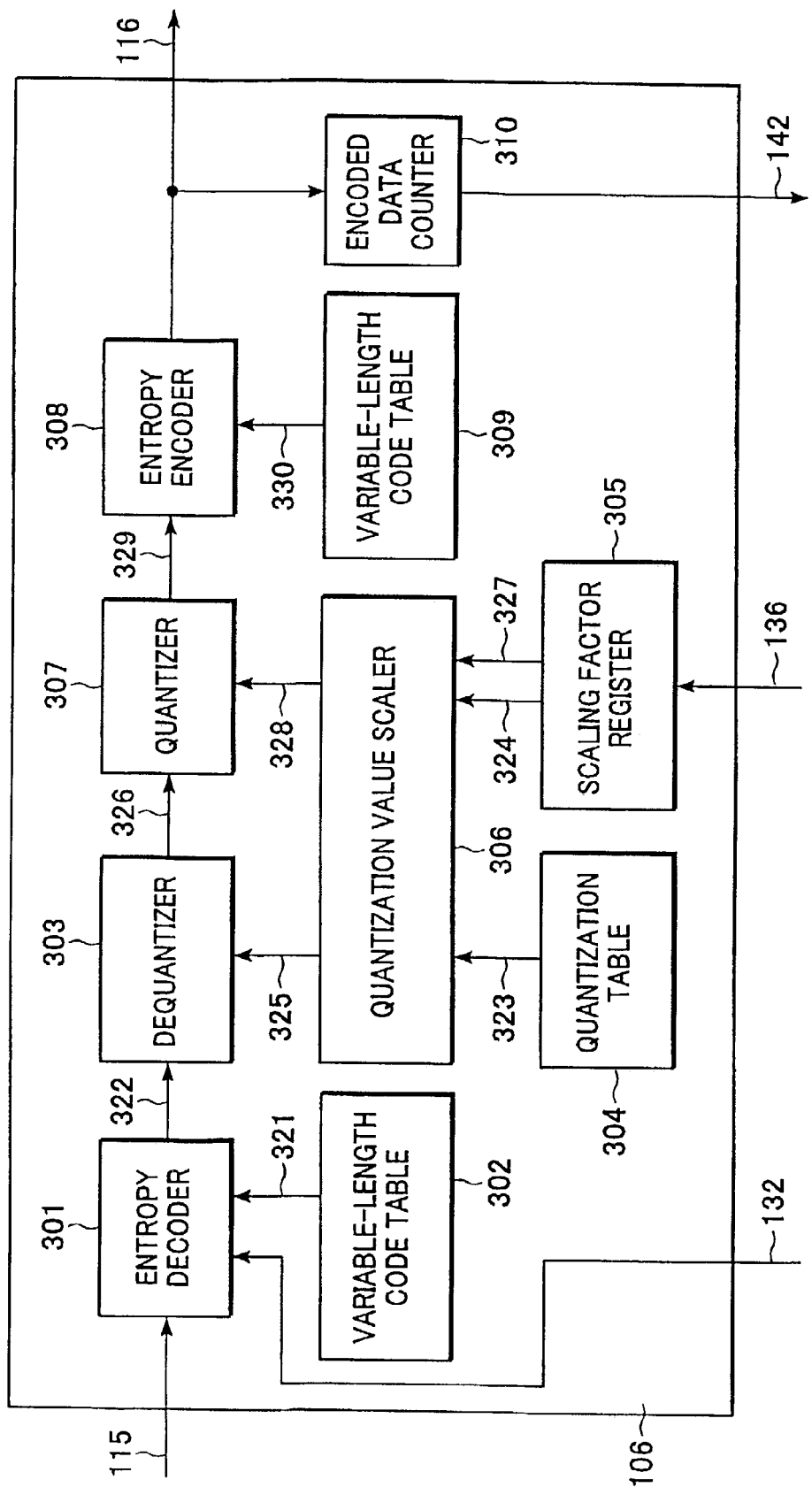
FIG. 3 is a block diagram illustrating a re-encoder of the first embodiment.

FIG. 3 is a block diagram illustrating the construction of the re-encoder 106 in the image encoder illustrated in FIG. 1.

As shown, the re-encoder 106 includes an entropy decoder (Huffman decoder) 301, variable-length code table (Huffman table) 302 for decoding, dequantizer 303, quantization table 304, scaling factor register 305, quantization value scaler 306, quantizer 307, entropy encoder (Huffman encoder) 308, variable-length code table 309 for encoding, encoded data counter 310, decoding variable-length code word signal line 321, decoded transform coefficient matrix signal line 322, quantization step signal line 323, dequantization scaling signal line 324, scaled dequantization step signal line 325, dequantized transform coefficient matrix signal line 326, quantization scaling signal line 327, scaled quantization step signal line 328, quantized transform coefficient matrix signal line 329, and encoding variable-length code word signal line 330.

Figure 4:
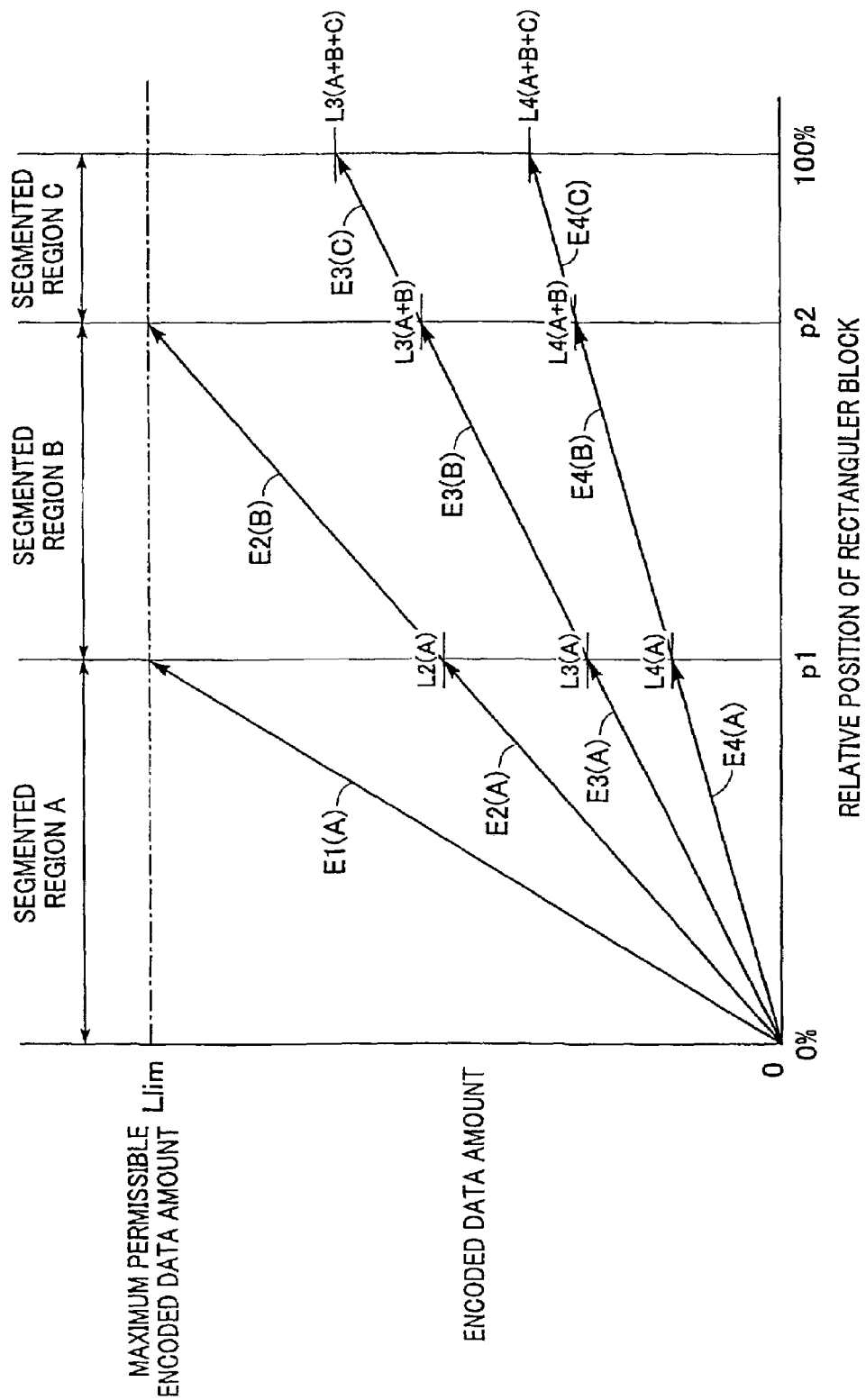
FIG. 4 is a chart illustrating a cumulative data amount of encoded data of a source image and a relative position of an encoded rectangular block on the source image.

FIG. 4 is a graph plotting the relationship between a cumulative value of individual encoded data amounts (represented in the ordinate), and a relative position of each rectangular block of the source image that is already encoded at a given point of time (represented in the abscissa). The cumulative value of the individual encoded data amounts is obtained by successively subjecting the source image data, input to the image encoder shown in FIG. 1, as data to be encoded, to the encoding process on a per unit block basis, each unit block having a predetermined size, using four types of scaling factors Q1, Q2, Q3, and Q4 to be discussed later as default values.

Figure 5:
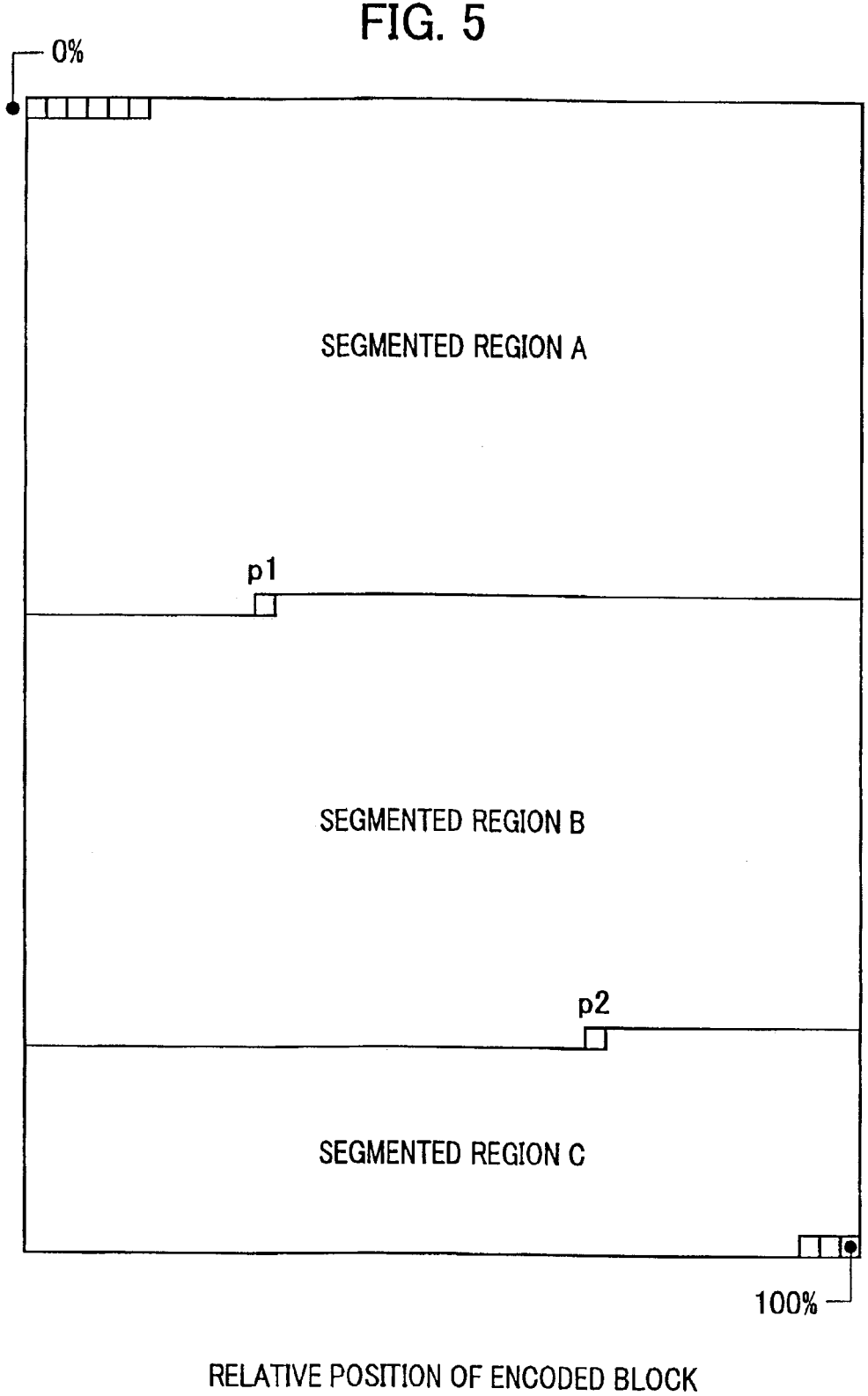
FIG. 5 illustrates the source image.

FIG. 5 illustrates the source image input as the data to be encoded. In this embodiment, FIG. 5 is considered as a one-page document, and is successively encoded from the top-left block to the bottom-right block. When the bottom-right block is encoded, the final encoded data almost reaches a target data amount. Regions A, B, and C are segmented simply for the following explanation, and in practice, the present invention is not limited to such a ratio of segmentation.

Figure 6:
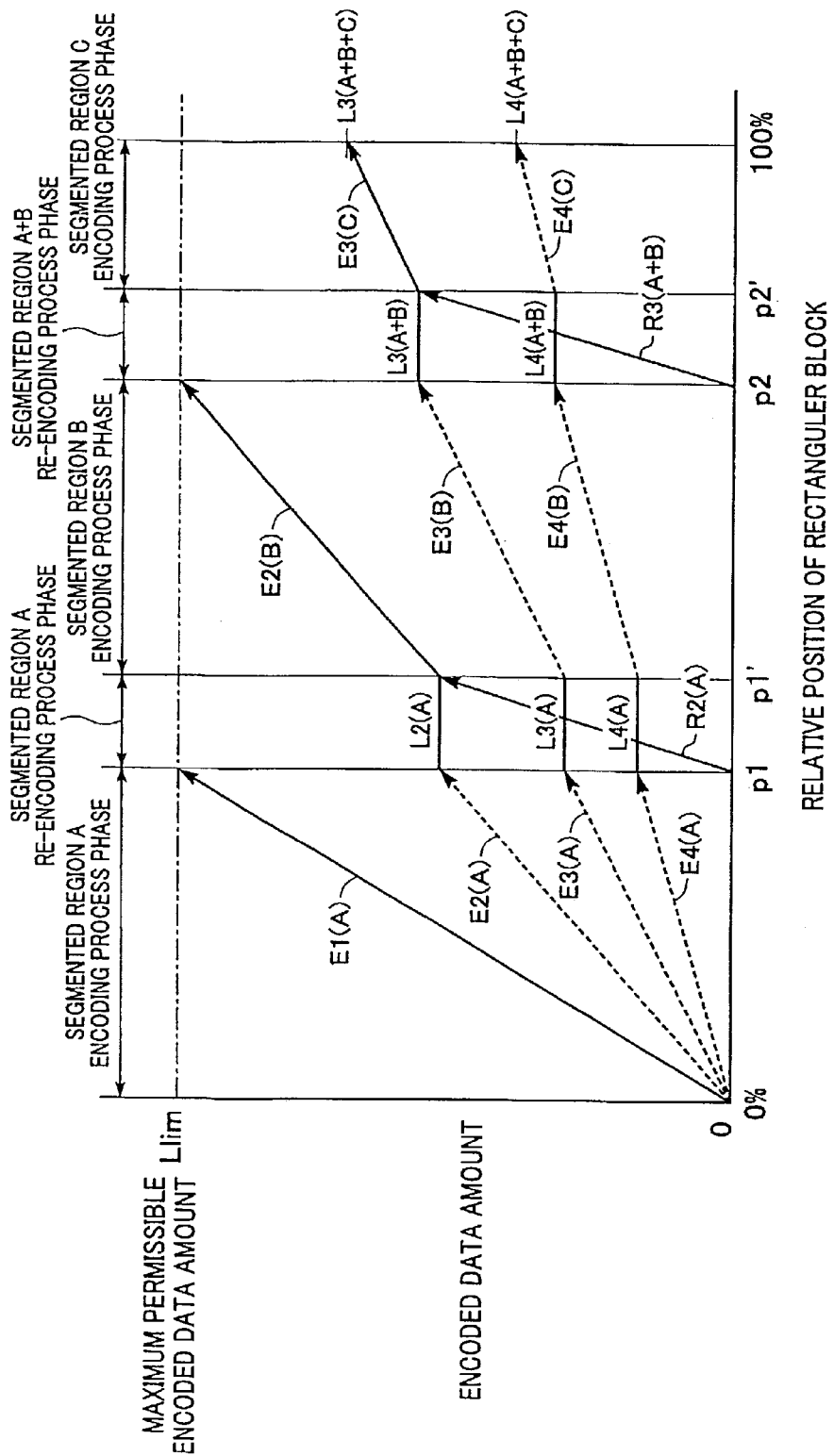
FIG. 6 illustrates a compression coding process performed on the source image.

FIG. 6 is a graph plotting the relationship between a cumulative value of individual encoded data amounts (represented in the ordinate), and a relative position of the rectangular blocks in the source image which is compression encoded at a given point of time (represented in the abscissa). In the course of the series of compression encoding steps performed to the source image data, input to the image encoder shown in FIG. 1, as data to be encoded, the cumulative value of the individual encoded data amounts is stored in the encoded data stream buffer 105.

Figure 7A:
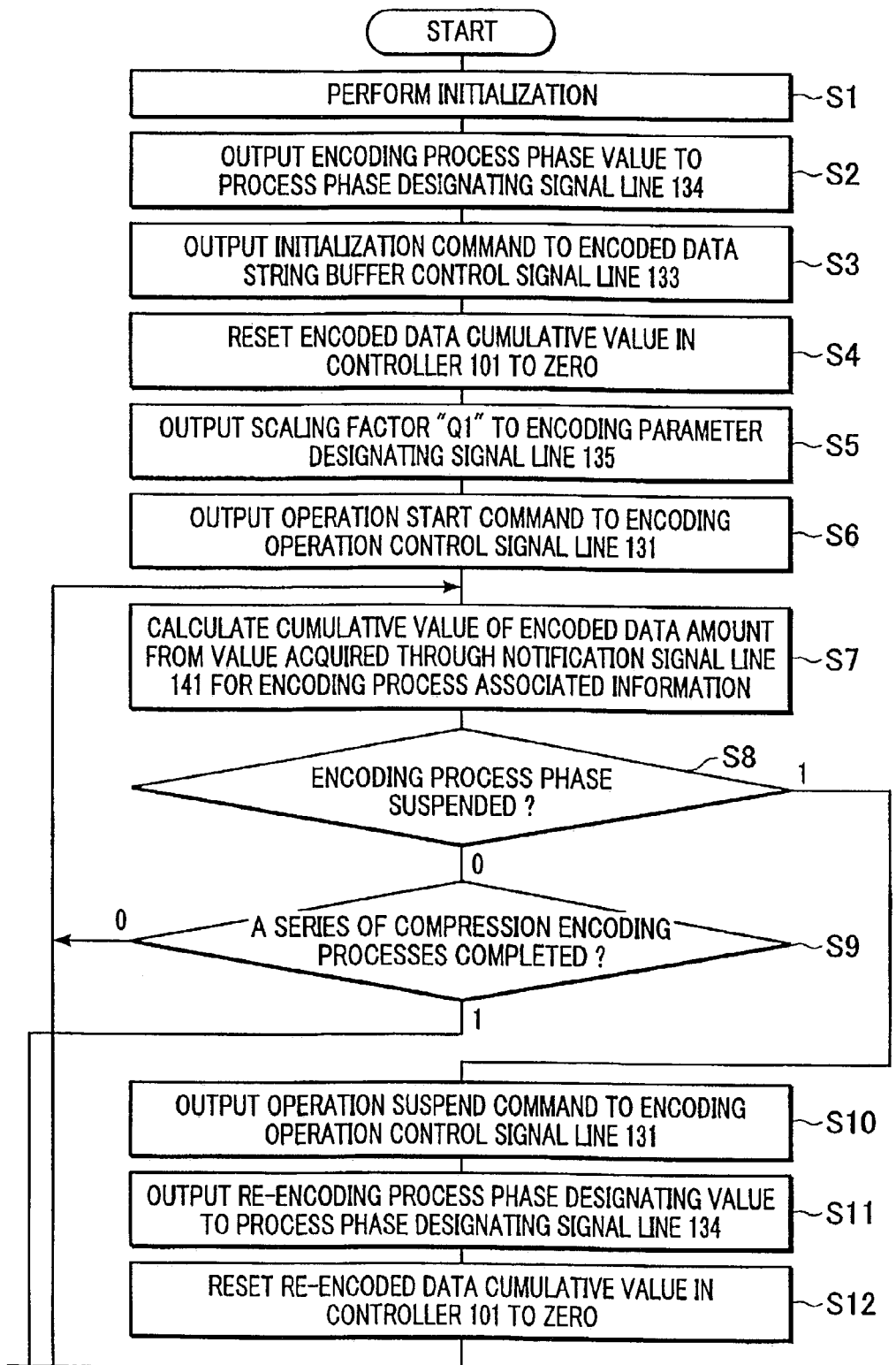
FIG. 7A is a flow diagram illustrating the operation of a controller.
Figure 7B:
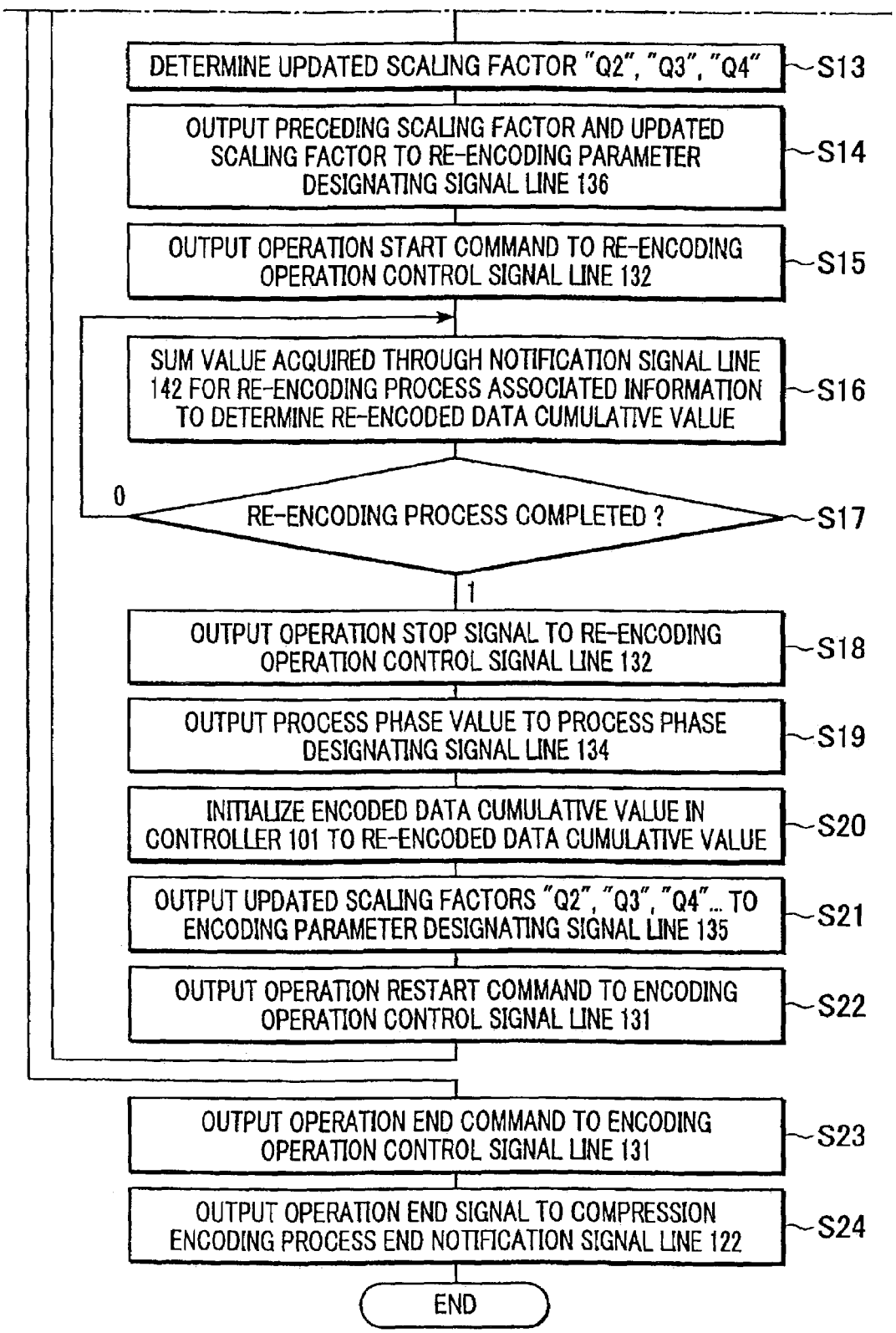
FIG. 7B is a continuation of FIG. 7A.

FIGS. 7A and 7B are flow diagrams illustrating the operation of the controller 101 in the image encoder illustrated in FIG. 1.

FIG. 8 illustrates one example of quantization step value matrix set in the quantization table 204 in the encoder 103 shown in FIG. 2 and in the quantization table 304 in the re-encoder 106.

FIGS. 9A and 9B illustrate scaled quantization step value matrices. The scaled quantization step value matrices are output when a scaling factor 21(a) and scaling factor 33(b) are set in the quantization step value matrix shown in FIG. 8 respectively using the quantization value scaler 206 in the encoder 103 shown in FIG. 2 and the quantization value scaler 306 in the re-encoder 106 shown in FIG. 3.

Figure 10:
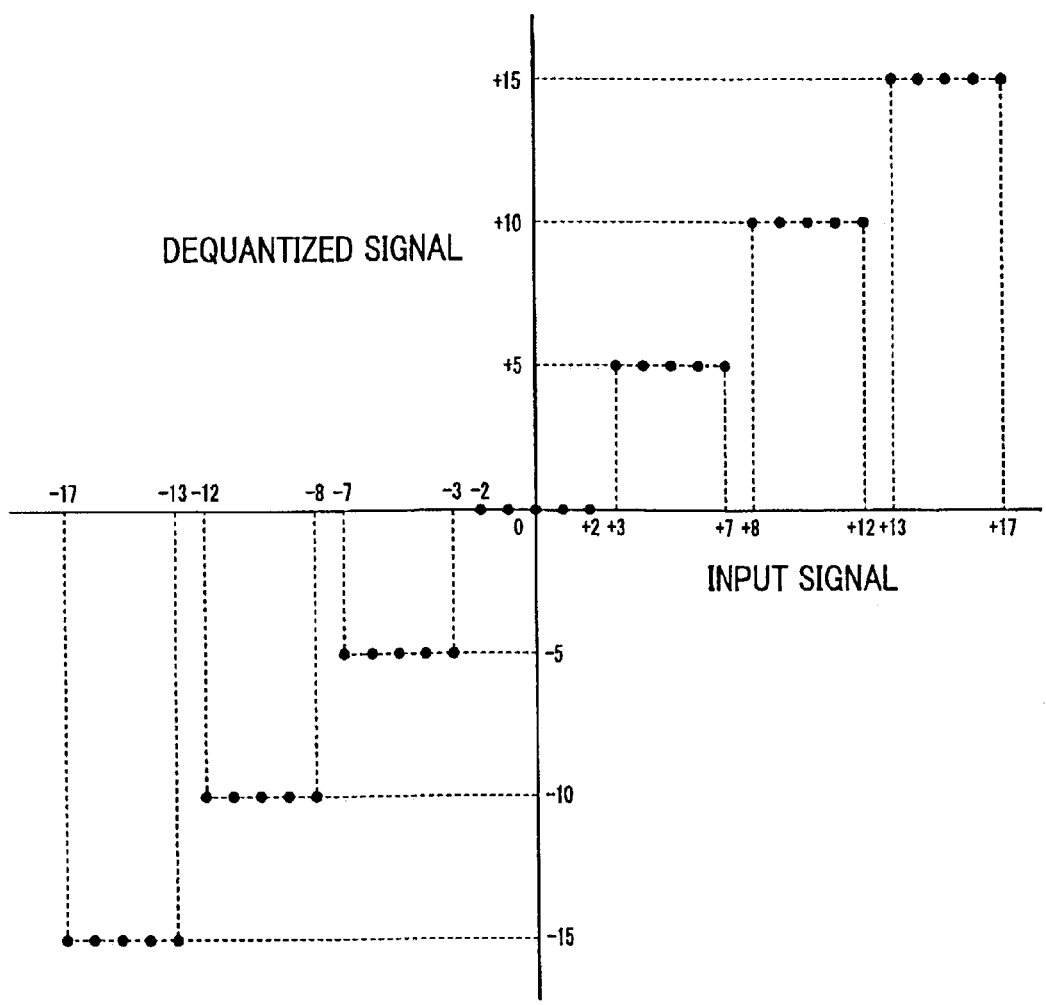
FIG. 10 illustrates input and output characteristics in quantization and dequantization calculations with a quantization step value being 5.

FIG. 10 is a graph plotting input and output characteristics of quantization and dequantization calculations when the value 5 as a scaled quantization step value is fed to the quantizer 203 in the image encoder shown in FIG. 1.

Figure 11:
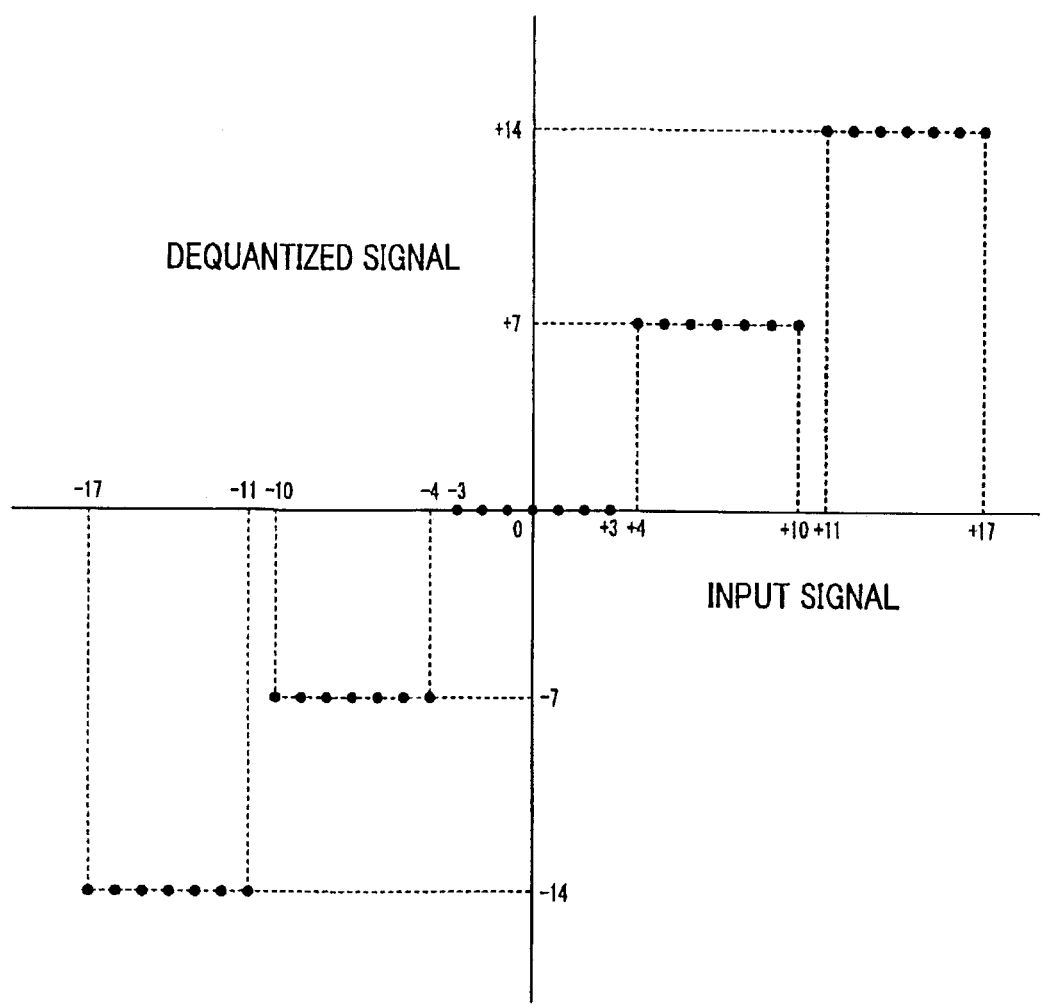
FIG. 11 illustrates input and output characteristics in quantization and dequantization calculations with a quantization step value being 7.

FIG. 11 is a graph plotting input and output characteristics of quantization and dequantization calculations when the value 7 as a scaled quantization step value is fed to the quantizer 203 in the image encoder shown in FIG. 1.

Figure 12:
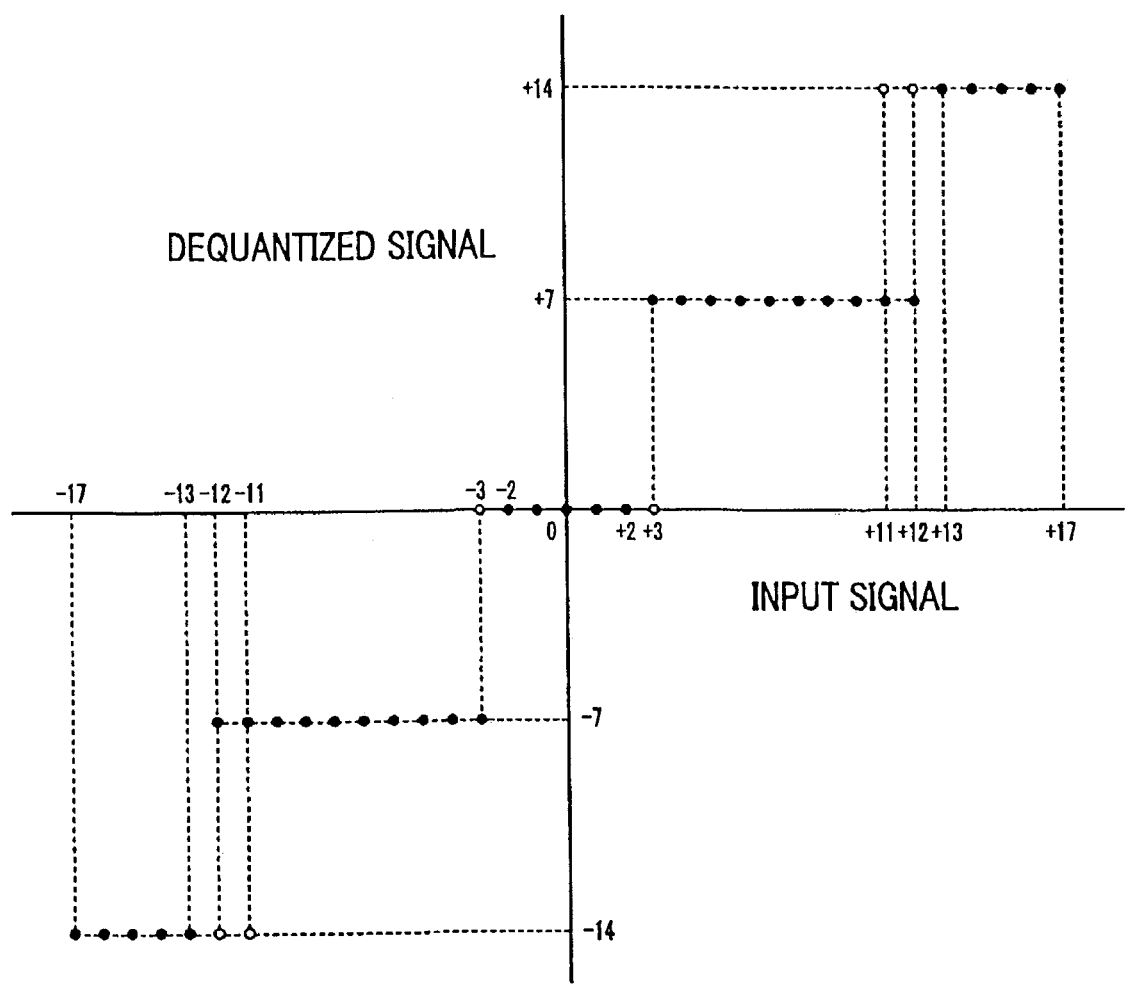
FIG. 12 illustrates input and output characteristics in quantization and dequantization calculations consecutively performed with a quantization step value of 5 and then with a quantization step value of 7.

FIG. 12 is a graph plotting input and output characteristics of quantization and dequantization calculations when the values 5 and 7 as scaled quantization step values are fed to the quantizer 203 in the image encoder shown in FIG. 1. In this case, the quantization and dequantization calculations are first performed with the quantization step value 5, and then, preformed with the quantization step value 7.

Referring to FIGS. 1 through 12, a series of compression encoding steps of the image encoder shown in FIG. 1 performed on the source image will now be discussed.

Before the operation of a series of compression encoding process in this embodiment, an external system (not shown) feeds, to the controller 101, information representing the size of an input source image as data to be encoded, more specifically, a total number of rectangular areas which is obtained when the source image is segmented into rectangular regions (bands or blocks) having a predetermined size.

The size of the rectangular blocks is now assumed to be a block of 16 by 16 pixels. (In practice, however, the 16 by 16 pixel block is further segmented into four 8 by 8 pixel blocks before performing JPEG encoding).

Before the operation of the series of compression encoding process, the controller 101 is also supplied with the maximum permissible data amount (a cumulative value of encoded data of one page) finally output (generated) by the image encoder as the encoded data of the source image, in other words, information representing a target code amount expressed in the number of bits or the number of bytes.

In the graphs plotted in FIGS. 4 and 6, the maximum permissible data amount Llim supplied to the controller 101 is represented by a dotted line horizontally extending in the top portion of each graph.

The external system sets beforehand the quantization step value matrix of 8 by 8 shown in FIG. 8 in the quantization table 204 in the encoder 103 before the start of the series of the compression encoding process. Elements of the matrix respectively correspond to orthogonal transform coefficients constituting an orthogonal transform coefficient matrix of 8 rows by 8 columns, and are referenced by the quantization value scaler 206 through the quantization step signal line 223.

Before the operation of the series of compression 26 encoding steps, the external system sets beforehand, in the quantization table 304 in the re-encoder 106, the quantization step value matrix identical to the quantization step value matrix of 8 by 8 shown in FIG. 8 set in the quantization table 204 in the encoder 103. The individual elements in the quantization table 304 are referenced by the quantization value scaler 306 through the quantization step signal line 323.

Before the operation of the series of compression encoding steps, configuration information of a variable-length code word tree is set beforehand in the variable-length code table 209 in the encoder 103 by the external system. Individual values in the variable-length code table 209 are referenced by the entropy encoder 208 through the variable-length code signal line 228.

Before the operation of the series of compression encoding, the external system sets beforehand, in the variable-length code table 302 for decoding and variable-length code table 309 for encoding in the re-encoder 106, configuration information identical to configuration information of the variable-length code word tree set in the variable-length code table 209 in the encoder 103. Individual values in the decoding variable-length code table 302 are referenced by the entropy decoder 301 through the decoding variable-length code word signal line 321. Individual values in the encoding variable-length code table 309 are referenced by the entropy encoder 308 through the encoding variable-length code word signal line 330.

Step S1

A variety of settings before the series of compression encoding steps are related to initialization operation, and correspond to step S1 in FIG. 7A.

Specifically, a command to start the series of compression encoding steps on the data to be encoded (source image) shown in FIG. 5 is sent to the image encoder of this embodiment through the compression encoding start request signal line 121 from the external system. In response, the controller 101 performs the following operation control process to start the initial encoding process phase.

Step S2

The controller 101 outputs a process phase designating signal to the process phase designating signal line 134, thereby setting the switch 104 to the side "E" to indicate that the image encoder is currently in the encoding process phase.

In response to the signal to the process phase designating signal line 134, the switch 104 is controlled so that the encoded data stream E1(A) supplied through the first encoded data stream signal line 113 is sent through the selected encoded data stream signal line 114.

Step S3

To empty the encoded data stream buffer 105, the controller 101 issues an initialization command through the encoded data stream buffer control signal line 133.

Step S4

The controller 101 resets, to zero, an encoded data amount cumulative value thereof representing a result of accumulating the amount of encoded data streams output from the encoder 103.

Step S5

The controller 101 outputs a value "Q1" as a first scaling factor through the encoding parameter designating signal line 135. The first scaling factor Q1 is stored in the scaling factor register 205 in the encoder 103.

Step S6

The controller 101 outputs a signal, commanding the encoder 103 to start the encoding process, through the encoding operation control signal line 131.

In response to the command signal, the image encoder of the present embodiment starts a first encoding process phase with an initial rectangular block forming the source image of FIG. 5.

The source image data, generated beforehand by an image forming device (not shown) and input through the source image data input signal line 111, is successively stored in the source image data buffer 102 in the order of raster scanning. The source image data is then successively output to the encoder 103 through the data input signal line 112 on a per rectangular unit block basis, the unit block having a predetermined size (16 by 16 pixels).

The orthogonal transform unit 201 in the encoder 103 divides the source image data in the rectangular unit region into a plurality of sample blocks, as a unit of processing in JPEG encoding, each block being as large as 8 rows by 8 columns. An orthogonal transform operation (a discrete cosine transform operation) is performed on a block by block basis. As a result of the operation, a plurality of orthogonal transform coefficient matrices of 8 rows by 8 columns are successively output through the transform coefficient matrix signal line 221.

A plurality of orthogonal transform coefficient matrices of 8 rows by 8 columns output on the transform coefficient matrix signal line 221 are selected by the switch 202, successively transferred to the selected transform coefficient matrix signal line 222 to be fed to the quantizer 203.

The quantization value scaler 206 in the encoder 103 performs a scaling calculation on quantization step values of 8 by 8 output through the quantization step signal line 223 from the quantization table 204 using a first scaling factor "Q1" stored in the scaling factor register 205. The scaled quantization step values in this calculation are successively fed to the quantizer 203 through the scaled quantization step signal line 225.

A series of scaling operations performed by the quantization value scaler 206 includes real number multiplication and integer rounding operations. For example, with a quantization step value of 11 and a scaling factor of 21, the integer 5 closest to a value obtained by multiplying the quantization step value of 11 by $21/50$ (4.62) is output as a scaled quantization step value. Similarly, with a quantization step value of 11 and a scaling factor 33, the integer 7 closest to a value obtained by multiplying the quantization value of 11 by $33/50$ (7.26) is output as a scaled quantization step value. If a scaling factor of 50 is provided, a quantization step value is multiplied by one, and a supplied quantization step value is directly output as is. If the integer rounding operation sets the closest integer to be zero, the value 1 is output as the quantization step value as an exception.

FIGS. 9A and 9B illustrate scaled quantization tables generated by the quantization value scaler 206. FIG. 9A illustrates the result of scaling calculation in which a scaling factor of 21 is applied to the quantization step value matrix shown in FIG. 8. FIG. 9B illustrates the result of scaling calculation in which a scaling factor of 31 is applied to the quantization step value matrix shown in FIG. 8.

The quantizer 203 in the encoder 103 performs a quantization calculation on a plurality of orthogonal transform coefficient matrices of 8 rows by 8 columns supplied from the orthogonal transform unit 201 through the switch 202 and transform coefficient matrix signal line 222, using the quantization step value matrix scaled by "Q1" supplied from the quantization value scaler 206. Quantized orthogonal transform coefficient matrices of 8 rows by 8 columns obtained as a result are successively fed to the entropy encoder 208 through the quantized transform coefficient matrix signal line 226.

The quantization calculation carried out by the quantizer 203 includes real number multiplication and integer rounding operations. The input and output characteristics of quantization and dequantization with a supplied quantization step value of 5 are plotted in FIG. 10. In this graph, the abscissa represents the value of a transform coefficient supplied to the encoder as the data to be encoded, and the ordinate represents the reproduced value of a transport coefficient which is obtained by dequantizing, with a quantization step of 5, a quantization calculation result which is quantized by a quantization step value of 5. Likewise, the input and output characteristics of quantization and dequantization with a quantization step value of 7 are plotted in FIG. 11.

The entropy encoder 208 in the encoder 103 performs a series of entropy encoding steps on the plurality of orthogonal transform coefficient matrices of 8 rows by 8 columns quantized by the quantizer 203. The series of entropy encoding steps include organizing two-dimensional data into one-dimensional data in accordance with a predetermined scanning order, run-length coding a non-effective transform coefficient having zero value, and variable-length coding referencing the variable-length code table 209. An encoded data stream E1(A) obtained as a result is thus output to the first encoded data stream signal line 113. Specifically, in the JPEG encoding, the orthogonal transform coefficient matrix is zigzag scanned to perform a two-dimensional Huffman coding in which zero run of a series of coefficients is followed by encoding effective coefficients.

The data length of the encoded data stream E1(A) output to the first encoded data stream signal line 113 is counted by the encoded data counter 210 in the encoder 103. Associated information obtained as a result containing the encoded data amount is output to the controller 101 through the encoding process associated information notification signal line 141 for notification.

Step S7

The data amount of the encoded data stream E1(A) corresponding to individual rectangular regions successively reported through the encoding process associated information notification signal line 141 is successively accumulated as the encoded data amount cumulative value in the controller 101.

Description of Step S8

FIG. 4 shows simulated changes in the encoded data when a series of compression encoding steps is performed on the source image (regions A–C) shown in FIG. 5 using four scaling factors "Q1", "Q2", "Q3", and "Q4" (Q1≦Q2≦Q3≦Q4). As shown, four straight lines starting from the origin of the graph represent changes in the data amount when the above-mentioned scaling factors are used. In practice, however, the cumulative value rarely increases as shown in the graph. For simplicity of explanation, the changes in the data amount are represented by the straight lines.

From among the four straight lines in the graph, the change in the encoded data amount obtained from the compression encoding using the minimum scaling factor Q1 corresponds to a straight line E1(A). The letter A in parentheses represents a point of time a segmented region A in the source image shown in FIG. 5 is encoded. Likewise, straight lines using the scaling factors Q2, Q3, and Q4 are respectively represented by E2(A–C), E3(A–C), and E4(A–C).

In the compression encoding using the first scaling factor Q1, the cumulative value of the encoded data amount reaches the maximum permissible encoded data amount Llim as early as the point of time when the encoding process to the source image data in the rectangular blocks (a unit of 16×16 pixels) reaches p1 in FIG. 5, namely, as early as the point of time when the encoding process of the segmented region A is completed. Subsequent rectangular blocks do not need the encoding process using the scaling factor Q1. In other words, it does not make sense to encode the subsequent rectangular blocks with the scaling factor Q1.

The point p1 in the abscissa of the graph in FIG. 4 corresponds to a two-dimensional position p1 in the source image shown in FIG. 5. As shown, the segmented region A contains a set of all rectangular blocks raster scanned from a rectangular block first encoded in the source image (the top left area in the source image) to p1.

The changes in the cumulative values of the encoded data amounts obtained when a series of compression encoding steps is performed on the segmented area A using the other scaling factors Q2, Q3, and Q4 on a simulation basis are plotted as straight lines E2(A), E3(A), and E4(A) in the graph. When the encoding process steps reaches the rectangular block p1 on a simulation basis, the cumulative values of the three encoded data amounts respectively become L2(A), L3(A), and L4(A). The following relationship holds.

$$Llim \geq L2(A) \geq L3(A) \geq L4(A)$$

Changes in the cumulative values of the encoded data amounts obtained when a series of compression encoding steps is performed using the other scaling factors Q2, Q3, and Q4 on a simulation basis during the encoding of the segmented area B (from a block subsequent to the block p1 to the block p2) in FIG. 5 are represented as E2(B), E3(B), and E4(B) in the graph. At the moment the encoding process on the block p2 is completed, the cumulative values in the three encoded data amounts with respect to the scaling factors Q2, Q3, and Q4 are respectively Llim, L3(A+B), and L4(A+B). The following relationship holds.

$$Llim \geq L3(A+B) \geq L4(A+B)$$

When the encoding process of all rectangular blocks constituting the segmented region A and segmented region B shown in FIG. 5 is completed using the scaling factor Q2, the cumulative value of the encoded data amount reaches the maximum permissible encoded data amount Llim. Subsequent rectangular blocks do not need the encoding process using the scaling factor Q2. In other words, it does not make sense to encode the subsequent rectangular blocks with the scaling factor Q2.

Changes in the cumulative values of the encoded data amounts obtained when a series of compression encoding steps is performed using the other scaling factors Q3, and Q4 on a simulation basis during the encoding of the segmented area C (from a block subsequent to the block p2 to the "bottom-right block") to 100% of the source image in FIG. 5 are represented as E3(C), and E4(C) in the graph.

At the moment the encoding process to the bottom-right block for 100% of the source image is completed, the cumulative values in the three encoded data amounts with respect to the scaling factors Q3 and Q4 are respectively L3(A+B+C) and L4(A+B+C). The following relationship holds.

$$L3(A+B+C) > L4(A+B+C)$$

At the moment the series of compression encoding steps is completed on all rectangular blocks constituting the source image shown in FIG. 5, the encoded data amounts L3(A+B+C) and L4(A+B+C) obtained using the scaling factors Q3 and Q4 do not reach the maximum permissible encoded data amount Llim in the graph. The encoded data amount meets the target value. If the encoding process is performed using the scaling factor Q1 and Q2, each of the resulting encoded data amounts exceeds the target value. The scaling factors Q1 and Q2 fail to satisfy the target of the compression encoding control.

From the standpoint of image quality, encoding distortion (image degradation) must be minimized. The scaling factor Q3 of the two scaling factors is more appropriate. The encoded data stream obtained using the scaling factor Q3 on the entire source image becomes the optimum steam, which the image encoder of the present embodiment must finally output.

The above discussion is based on the result which is known after the completion of the encoding of the entire source image. Before the series of compression encoding, it is not possible to determine that the scaling factor Q3 is more appropriate from among the scaling factor candidates.

It is difficult to satisfy simultaneously the conditions that a document of a plurality of pages is compressed on a real-time basis, that the encoded data remains below the maximum permissible encoded data amount Llim in each page of the document, and that the same parameter ($Q_x$) is used in the encoding of the entire page.

The encoding process of the image data in succession to step S7 is discussed below.

The encoded data streams E1(A) of the rectangular blocks output to the signal line 113 are successively transferred to the encoded data stream buffer 105 through the switch 104 and selected encoded data stream signal line 114 for storage there.

The encoded data streams E1(A) successively stored in the encoded data stream buffer 105 during the first encoding process phase are the ones which are encoded using the first scaling factor Q1.

The cumulative value of the data amount of the stored encoded data streams E1(A) is summed in the controller 101. A change in the cumulative value is represented by the straight line E1(A) in the graph shown in FIG. 6. The straight line E1(A) corresponds to the straight line E1(A) shown in FIG. 4.

At the moment the relative position of the rectangular block in the source image encoded by the encoder 103 reaches p1, the cumulative value of the data amount of the encoded data streams E1(A) becomes equal to Llim.

Step S8

The controller 101 determines that the first encoding process phase currently in progress should be briefly suspended when the controller 101 checks that the maximum permissible encoded data amount Llim is reached by the cumulative value of the amount of the encoded data streams E1(A) corresponding to all rectangular blocks forming the segmented region A in the source image stored in the encoded data stream buffer 105.

Step S10

If the controller 101 determines that the operation of the encoding process phase should be suspended, the controller 101 immediately sends a command through the encoding operation control signal line 131 to instruct the encoder 103 to suspend the operation of the block-based encoding process phase.

The controller 101 perform the following control process, thereby transitioning the process phase of the image encoder from the first encoding process phase to a first re-encoding process phase.

Step S11

The controller 101 outputs a process phase designating signal to the process phase designating signal line 134, setting the switch 104 to the position 'R' and thereby indicating that the image encoder is currently in the re-encoding process phase.

In response to the signal on the process phase designating signal line 134, the switch 104 changes the connection thereof to send the encoded data streams R2(A) supplied through the second encoded data stream signal line 116 to the selected encoded data stream signal line 114.

Step S12

The controller 101 resets, to zero, the encoded data amount cumulative value indicating the result of accumulation of the data amount of the encoded data streams output from the re-encoder 106.

Step S13

The controller 101 determines the second scaling factor Q2, which is an updated scaling factor. The updated scaling factor Q2 is based on the first scaling factor Q1 which is fed to the encoder 103 during the preceding first encoding process phase, and the result of the encoding process which is performed on the final rectangular block at a relative position p1 in the source image using the first scaling factor Q1.

Step S14

The controller 101 outputs the determined second scaling factor Q2 together with the first scaling factor Q1 to the re-encoding parameter designating signal line 136. The scaling factor register 305 in the re-encoder 106 stores the first scaling factor Q1 and second scaling factor Q2.

Step S15

The controller 101 sends a command signal through the re-encoding operation control signal line 132, instructing the re-encoder 106 to start the operation of the re-encoding process.

In response to the command signal, the image encoder of the present embodiment starts the re-encoding process phase on the encoded data streams E1(A) corresponding to all rectangular blocks contained in the segmented region A in the source image shown in FIG. 5.

The encoded data streams E1(A), which are successively stored in the encoded data stream buffer 105 during the preceding first encoding process phase, are read into the re-encoder 106 through the encoded data stream buffer read signal line 115 on a per unit data stream basis, unit data stream corresponding to the encoded data in each rectangular block.

The entropy decoder 301 in the re-encoder 106 performs a series of entropy decoding process steps on the read encoded data stream E1(A) in the rectangular block. The series of entropy decoding process steps include variable-length decoding referencing the decoding variable-length code table 302, run length decoding non-effective transform coefficients having zero value, and organizing one-dimensional data into two-dimensional data in a predetermined scanning order. A plurality of resulting decoded transform coefficient matrices of 8 rows by 8 columns are successively output to the dequantizer 303 through the decoded transform coefficient matrix signal line 322.

The quantization value scaler 306 in the re-encoder 106 performs a scaling calculation on the 8 by 8 quantization step values, shown in FIG. 8, read from the quantization table 304 through the quantization step signal line 323 using the first scaling factor Q1 stored in the scaling factor register 305. The 8 by 8 quantization step values scaled using the first scaling factor Q1 are successively fed to the dequantizer 303 through the scaled dequantization step signal line 325.

A series of scaling steps performed by the quantization value scaler 306 is identical to the series of scaling steps performed by the quantization value scaler 206 in the encoder 103.

The dequantizer 303 in the re-encoder 106 dequantizes a plurality of decoded orthogonal transform coefficient matrices of 8 rows by 8 columns supplied from the entropy decoder 301 through the decoded transform coefficient matrix signal line 322, using the quantization step value matrix of 8 by 8, scaled using the scaling factor Q1 and supplied from the quantization value scaler 306 through the scaled dequantization step signal line 325. As a result, the dequantized orthogonal transform coefficient matrices of 8 rows by 8 columns are successively fed to the quantizer 307 through the dequantized transform coefficient matrix signal line 326.

The dequantization process performed by the dequantizer 303 is a simple integer multiplication operation. For example, FIG. 10 illustrates input and output characteristics of the quantization and dequantization calculations that are carried out using a supplied quantization step value of 5. In the graph, the abscissa represents the transform coefficients supplied to the encoder as data to be quantized, and the ordinate represents the reproduced value of a transport coefficient which is obtained by dequantizing, with a quantization step of 5, a quantization calculation result which is quantized by a quantization step value of 5. Likewise, the input and output characteristics of quantization and dequantization with a quantization step value of 7 are plotted in FIG. 11.

The quantization value scaler 306 in the re-encoder 106 performs a scaling process on the quantization step values of 8 by 8, shown in FIG. 8, read from the quantization table 304 through the quantization step signal line 323, using the second scaling factor Q2 stored in the scaling factor register 305. The quantization step values of 8 rows by 8 columns scaled using the scaling factor Q2 are successively fed to the quantizer 307 through the scaled quantization step signal line 328.

The quantizer 307 in the re-encoder 106 quantizes a plurality of dequantized orthogonal transform coefficient matrices of 8 rows by 8 columns supplied from the dequantizer 303 through the dequantized transform coefficient matrix signal line 326 using the quantization step value matrix of 8 by 8, scaled using the scaling factor Q2, and supplied from the quantization value scaler 306 through the scaled quantization step signal line 328. The quantized orthogonal transport coefficient matrices of 8 rows by 8 columns obtained as a result are successively fed to the entropy encoder 308 through the quantized transform coefficient matrix signal line 329.

Like the quantization process performed by the quantizer 203 in the encoder 103, the quantization process performed by the quantizer 307 includes real number division and integer rounding operations. The input and output characteristics of the quantizer 307 are identical to those of the quantizer 203.

The transform coefficients supplied to the quantizer 307 in the re-encoder 106 are the ones that have been reproduced in the quantization and dequantization process at least once. If the quantization step value is 2 or higher, a quantization distortion responsive to the magnitude of the quantization step value is contained therewithin.

FIG. 12 is a graph plotting input and output characteristics of the quantization and dequantization processes that are performed, using an updated quantization step value of 7, on the transform coefficients that are reproduced by performing the quantization and dequantization processes using the quantization step value of 5. In this graph, the abscissa represents the transform coefficients supplied to the encoder as data to be quantized, with the quantization step value of 5 applied. The ordinate represents the reproduced value of a transport coefficient which is obtained by performing the quantization and dequantization processes with the quantization step value of 7, the quantization and dequantization process result which already is quantized by the quantization step value of 5.

The graph in FIG. 12 plotting the input and output characteristics of the quantization and dequantization calculations using the quantization step value of 5 and then the quantization step value of 7 is compared with the graph in FIG. 11 plotting the input and output characteristics of the quantization and dequantization calculations using the quantization step value of 7 only. The comparison of the two graphs reveals that there is a difference in the reproduced values of the transform coefficients as final results.

The reproduced values of the transform coefficients which are obtained by performing the quantization and dequantization processes to the transform coefficients +11/−11 using the quantization step value of 7 are +14/−14 as read from the graph shown in FIG. 11. However, the reproduced values of the transform coefficients which are obtained by performing the reproduced values, which are already quantized and dequantized using the quantization step value of 5, using the quantization step value of 7 are +7/−7 as read from the graph shown in FIG. 12.

The entropy encoder 308 in the re-encoder 106 performs a series of entropy encoding steps on the plurality of orthogonal transform coefficient matrices of 8 rows by 8 columns supplied from the quantizer 307 through the quantized transform coefficient matrix signal line 329. The series of entropy encoding steps include organizing two-dimensional data into one-dimensional data in accordance with a predetermined scanning order, run-length coding a non-effective transform coefficient having zero value, and variable-length coding referencing the variable-length code table 309. An encoded data stream R2(A) obtained as a result is thus output to the second encoded data stream signal line 116.

The data length of the encoded data stream R2(A) output to the second encoded data stream signal line 116 from the entropy encoder 308 in the re-encoder 106 is counted by the encoded data counter 310 in the re-encoder 106. The encoded data amount (associated information) obtained as a result is fed to the controller 101 through the re-encoding process associated information notification signal line 142 for notification.

Step S16

The data amounts of the encoded data streams R2(A) corresponding to the rectangular blocks, of which the re-encoder 106 successively notifies the controller 101 through the re-encoding process associated information notification signal line 142, are successively summed in the controller 101 as the re-encoded data amount cumulative value.

The encoded data streams R2(A) corresponding to individual rectangular blocks output to the second encoded data stream signal line 116 are successively transferred to the encoded data stream buffer 105 through the switch 104 and then the selected encoded data stream signal line 114 for storage.

The encoded data streams R2(A), which are successively stored in the encoded data stream buffer 105 during the first re-encoding process phase subsequent to the preceding first encoding process phase, are the ones that have been generated through the re-encoding process using the second scaling factor Q2. The cumulative value of the data amount of the stored encoded data stream R2(A) is summed in the controller 101. The change in the cumulative value is plotted as a straight line R2(A) in FIG. 6. The straight line R2(A) corresponds to the straight line E2(A) plotted in the graph in FIG. 4. The cumulative value of the encoded data stream R2(A) reaches L2(A) as early as the point of time when the re-encoding process to all encoded data streams E1(A) to be processed by the re-encoder 106 is completed, in other words, as early as the point of time when the rectangular block in a relative position in the source image corresponding to the encoded data stream E1(A), which is re-encoded by the re-encoder 106, reaches p1.

Step S17

After checking that the encoded data streams E1(A) corresponding to all rectangular blocks constituting the segmented region A in the source image stored in the encoded data stream buffer 105 are re-encoded, and that the resulting encoded data streams R2(A) are substituted for, the controller 101 quits the first re-encoding process phase currently in progress, and determines that a second encoding process phase should quickly resume.

Step S18

Upon determining that the re-encoding process phase should quit, the controller 101 immediately outputs a stop command to the re-encoding operation control signal line 132 to instruct the re-encoder 106 to stop the re-encoding process.

The controller 101 perform the following control process, thereby transitioning the process phase of the image encoder from the first re-encoding process phase to a second encoding process phase.

Step S19

The controller 101 outputs a process phase designating signal to the process phase designating signal line 134, thereby setting the switch 104 to the position 'E' to indicate that the encoding process phase resumes.

In response to the signal on the process phase designating signal line 134, the switch 104 changes the connection thereof to send the encoded data streams E2(B) supplied through the first encoded data stream signal line 113 to the selected encoded data stream signal line 114.

Step S20

The controller 101 defaults the encoded data amount cumulative value thereof, representing the result of accumulation of data amount of the encoded data streams output from the encoder 103, to L2(A) which is the re-encoded data amount cumulative value counted during the preceding first re-encoding process phase.

Step S21

The controller 101 outputs, to the encoding parameter designating signal line 135, the scaling factor Q2, which is determined at the beginning of the preceding first re-encoding process phase, as a second scaling factor. The second scaling factor Q2 is stored together with the first scaling factor Q1 in the scaling factor register 205 in the encoder 103.

Step S22

The controller 101 sends an encoding operation restart command signal to the encoding operation control signal line 131 to instruct the encoder 103 to resume the encoding process.

In response to the command signal, the image encoder of the present embodiment starts the second encoding process phase with a rectangular block succeeding to p1 in the relative position thereof in the source image shown in FIG. 5, namely, with a first one of the rectangular blocks constituting the segmented region B.

The orthogonal transform unit 201 in the encoder 103 performs an orthogonal transform operation on the source image data in the rectangular blocks forming the segmented region B read from the source image data buffer 102, on a block-by-block basis. A plurality of orthogonal transform coefficients of 8 rows by 8 columns obtained as a result are successively output to the transform coefficient matrix signal line 221, then to the transform coefficient matrix signal line 222 selected by the switch 202, and then successively fed to the quantizer 203.

The quantization value scaler 206 in the encoder 103 performs the scaling process on the quantization step values of 8 by 8, shown in FIG. 8, read from the quantization table 204 through the quantization step signal line 223, using alternately the first scaling factor Q1 and second scaling factor Q2 stored in the scaling factor register 205. The scaled quantization step values of 8 rows and 8 columns scaled using the scaling factor Q1 and the scaled quantization step values of 8 rows by 8 columns scaled using the scaling factor Q2 are successively fed to the quantizer 203 through the scaled quantization step signal line 225.

For example, if the scaling operation is performed on the quantization step value of 11 with the first scaling factor of 21 and second scaling factor of 33, the values 5 and 7 are alternately output as the quantization step value.

The quantizer 203 in the encoder 103 performs a quantization process on a plurality of orthogonal transform coefficient matrices of 8 rows and 8 columns supplied from the orthogonal transform unit 201 through the switch 202 and then selected transform coefficient matrix signal line 222, using elements corresponding to the quantization step value matrix of 8 by 8 which is scaled by the scaling factor Q1 and supplied from the quantization value scaler 206 through the scaled quantization step signal line 225. The quantized orthogonal transform coefficient matrices of 8 rows and 8 columns obtained as a result are successively fed to the dequantizer 207 through the quantized transform coefficient matrix signal line 226.

The dequantizer 207 in the encoder 103 performs a dequantization process on a plurality of quantized orthogonal transform coefficient matrices of 8 rows by 8 columns supplied from the quantizer 203 through the quantized transform coefficient matrix signal line 226, using the quantization step value matrix of 8 by 8 which is scaled using the scaling factor Q1 and supplied from the quantization value scaler 206 through the scaled quantization step signal line 225. The dequantized orthogonal matrices of 8 rows and 8 columns obtained as a result are successively fed to the quantizer 203 through the dequantized transform coefficient matrix signal line 227, switch 202 and then selected transform coefficient matrix signal line 222.

The quantizer 203 in the encoder 103 performs a quantization process on the plurality of orthogonal transport coefficient matrices of 8 rows by 8 columns supplied from the dequantizer 207 through the switch 202, and then selected transform coefficient matrix signal line 222, using elements corresponding to the quantization step value matrix of 8 by 8 which is scaled using the scaling factor Q2 and supplied from the quantization value scaler 206 through the scaled quantization step signal line 225. The quantized orthogonal transport coefficients of 8 by 8 obtained as a result are successively fed to the entropy encoder 208 through the quantized transform coefficient matrix signal line 226.

FIG. 12 illustrates input and output characteristics of the quantization and dequantization processes respectively performed by the quantizer 203 and dequantizer 207.

The entropy encoder 208 in the encoder 103 performs a series of entropy encoding steps on the plurality of orthogonal transform coefficient matrices of 8 rows by 8 columns supplied from the quantizer 203 through the quantized transform coefficient matrix signal line 226. The series of entropy encoding steps include organizing two-dimensional data into one-dimensional data in accordance with a predetermined scanning order, run-length coding a non-effective transform coefficient having zero value, and variable-length coding referencing the variable-length code table 209. An encoded data stream E2(B) obtained as a result is thus output to the first encoded data stream signal line 113. The encoded data amount (associated information) counted by the encoded data counter 210 is sent to the controller 101 through the encoding process associated information notification signal line 141 for notification.

Step S7 (Second Cycle)

The data amounts of the encoded data streams E2(B) corresponding to the rectangular blocks, of which the encoder 103 successively notifies the controller 101 through the encoding process associated information notification signal line 141, are successively summed in the controller 101 as the encoded data amount cumulative value.

The encoded data streams E2(B) corresponding to individual rectangular blocks output to the first encoded data stream signal line 113 are successively transferred to the encoded data stream buffer 105 through the switch 104 and then the selected encoded data stream signal line 114 for storage in succession to the encoded data stream R2(A) stored during the preceding first re-encoding process phase.

The encoded data streams E2(B), which are successively stored in the encoded data stream buffer 105 during the second encoding process phase, are the ones that have been generated through the encoding process using the second scaling factor Q2. The cumulative value of the data amount of the stored encoded data stream E2(B) is summed in the controller 101. The change in the cumulative value is plotted as a straight line E2(B) in FIG. 6. The straight line E2(B) corresponds to the straight line E2(B) plotted in the graph in FIG. 4. The cumulative value of the encoded data streams R2(A) and encoded data stream E2(B) reaches the maximum permissible encoded data amount Llim as early as the point of time when a relative position of the rectangular block in the source image encoded by the encoder 103 reaches p2.

Step S8 (Second Cycle)

After checking that the encoded data streams R2(A) and E2(B) corresponding to all rectangular blocks constituting the segmented region A and segmented region B in the source image stored in the encoded data stream buffer 105 reach the maximum permissible encoded data amount Llim, the controller 101 determines that the second encoding process phase currently in program should be suspended again.

Step 10 (Second Cycle)

If the controller 101 determines that the operation of the encoding process phase should be suspended, the controller 101 immediately sends a command through the encoding operation control signal line 131 to instruct the encoder 103 to suspend the operation of the encoding process phase.

The controller 101 perform the following control process, thereby transitioning the process phase of the image encoder from the second encoding process phase to a second re-encoding process phase.

Step S11 (Second Cycle)

The controller 101 outputs a process phase designating signal to the process phase designating signal line 134, thereby setting the switch 104 to the position 'R' to indicate that the image encoder is currently in the re-encoding process phase again.

In response to the signal on the process phase designating signal line 134, the switch 104 changes the connection thereof to send the encoded data streams R3(A+B) supplied through the second encoded data stream signal line 116 to the selected encoded data stream signal line 114.

Step S12 (Second Cycle)

The controller 101 resets, to zero, the encoded data amount cumulative value indicating the result of accumulation of the data amount of the encoded data streams output from the re-encoder 106.

Step S13 (Second Cycle)

The controller 101 determines the third scaling factor Q3, which is an updated scaling factor. The updated scaling factor is based on the second scaling factor Q2 which is fed to the encoder 103 during the preceding second encoding process phase, and the result of the encoding process which is performed on the final rectangular block at a relative position p2 in the source image using the second scaling factor Q2.

Step S14 (Second Cycle)

The controller 101 outputs the determined third scaling factor Q3 together with the second scaling factor Q2 to the re-encoding parameter designating signal line 136. The scaling factor register 305 in the re-encoder 106 stores the second scaling factor Q2 and third scaling factor Q3.

Step S15 (Second Cycle)

The controller 101 sends a command signal through the re-encoding operation control signal line 132, instructing the re-encoder 106 to start the operation of the re-encoding process.

In response to the command signal, the image encoder of the present embodiment starts the re-encoding process phase on the encoded data streams R2(A) and E2(B) corresponding to all rectangular blocks contained in the segmented region A and segmented region B in the source image shown in FIG. 5.

The encoded data streams R2(A) and E2(B), which are successively stored in the encoded data stream buffer 105 during the preceding first re-encoding process phase and second encoding process phase, are read into the re-encoder 106 through the encoded data stream buffer read signal line 115 on a per unit data stream basis, unit data stream corresponding to the encoded data in each rectangular block.

The entropy decoder 301 in the re-encoder 106 performs a series of entropy decoding process steps on the read encoded data stream R2(A) and E2(B) in the rectangular block. The series of entropy decoding process steps include variable-length decoding referencing the decoding variable-length code table 302, run length decoding non-effective transform coefficients having zero value, and organizing one-dimensional data into two-dimensional data in a predetermined scanning order. A plurality of resulting decoded transform coefficient matrices of 8 rows by 8 columns are successively output to the dequantizer 303 through the decoded transform coefficient matrix signal line 322.

The quantization value scaler 306 in the re-encoder 106 performs a scaling calculation on the 8 by 8 quantization step values, shown in FIG. 8, read from the quantization table 304 through the quantization step signal line 323 using the second scaling factor Q2 stored in the scaling factor register 305. The 8 by 8 quantization step values scaled using the second scaling factor Q2 are successively fed to the dequantizer 303 through the scaled dequantization step signal line 325.

The dequantizer 303 in the re-encoder 106 dequantizes a plurality of decoded orthogonal transform coefficient matrices of 8 rows by 8 columns supplied from the entropy decoder 301 through the decoded transform coefficient matrix signal line 322, using the quantization step value matrix of 8 by 8 scaled using the scaling factor Q2 and supplied from the quantization value scaler 306 through the scaled dequantization step signal line 325. As a result, the dequantized orthogonal transform coefficient matrices of 8 rows by 8 columns are successively fed to the quantizer 307 through the dequantized transform coefficient matrix signal line 326.

The quantization value scaler 306 in the re-encoder 106 performs a scaling process on the quantization step values of 8 by 8, shown in FIG. 8, read from the quantization table 304 through the quantization step signal line 323, using the third scaling factor Q3 stored in the scaling factor register 305. The quantization step values of 8 rows by 8 columns scaled using the scaling factor Q3 are successively fed to the quantizer 307 through the scaled quantization step signal line 328.

The quantizer 307 in the re-encoder 106 quantizes a plurality of dequantized orthogonal transform coefficient matrices of 8 rows by 8 columns supplied from the dequantizer 303 through the dequantized transform coefficient matrix signal line 326 using the quantization step value matrix of 8 by 8, scaled using the scaling factor Q3, and supplied from the quantization value scaler 306 through the scaled quantization step signal line 328. The quantized orthogonal transport coefficient matrices of 8 rows by 8 columns obtained as a result are successively fed to the entropy encoder 308 through the quantized transform coefficient matrix signal line 329.

The entropy encoder 308 in the re-encoder 106 performs a series of entropy encoding steps on the plurality of quantized orthogonal transform coefficient matrices of 8 rows by 8 columns supplied from the quantizer 307 through the quantized transform coefficient matrix signal line 329. The series of entropy encoding steps include organizing two-dimensional data into one-dimensional data in accordance with a predetermined scanning order, run-length coding a non-effective transform coefficient having zero value, and variable-length coding referencing the variable-length code table 309. An encoded data stream R3(A+B) obtained as a result is thus output to the second encoded data stream signal line 116.

The data length of the encoded data stream R3(A+B) output to the second encoded data stream signal line 116 from the entropy encoder 308 in the re-encoder 106 is counted by the encoded data counter 310 in the re-encoder 106. The encoded data amount (associated information) obtained as a result is fed to the controller 101 through the re-encoding process associated information notification signal line 142 for notification.

Step S16 (Second Cycle)

The data amounts of the encoded data streams R3(A+B) corresponding to the rectangular blocks, of which the re-encoder 106 successively notifies the controller 101 through the re-encoding process associated information notification signal line 142, are successively summed in the controller 101 as the re-encoded data amount cumulative value.

The encoded data streams R3(A+B) corresponding to individual rectangular blocks output to the second encoded data stream signal line 116 are successively transferred to the encoded data stream buffer 105 through the switch 104 and then the selected encoded data stream signal line 114 for storage.

The encoded data streams R3(A+B), which are successively stored in the encoded data stream buffer 105 during the second re-encoding process phase subsequent to the preceding second encoding process phase, are the ones that have been generated through the re-encoding process using the third scaling factor Q3. The cumulative value of the data amount of the stored encoded data stream R3(A+B) is summed in the controller 101. The change in the cumulative value is plotted as a straight line R3(A+B) in FIG. 6. The straight line R3(A+B) corresponds to the straight lines E3(A) and E3(B) plotted in the graph in FIG. 4. The cumulative value of the encoded data stream R3(A+B) reaches L3(A+B) as early as the point of time when the re-encoding process to all encoded data streams R2(A) and E2(B) to be processed by the re-encoder 106 is completed, namely, as early as the point of time when the rectangular block in a relative position in the source image corresponding to the encoded data streams R2(A) and E2(B) reaches p2.

Step S17 (Second Cycle)

After checking that the encoded data streams R2(A) and E2(B) corresponding to all rectangular blocks constituting the segmented region A and segmented region B in the source image stored in the encoded data stream buffer 105 are re-encoded, and that the resulting encoded data streams R3(A+B) are substituted for, the controller 101 quits the second re-encoding process phase currently in progress, and determines that a third encoding process phase should quickly resume.

Step S18 (Second Cycle)

Upon determining that the re-encoding process phase should quit, the controller 101 immediately outputs a stop command to the re-encoding operation control signal line 132 to instruct the re-encoder 106 to stop the re-encoding process.

The controller 101 perform the following control process, thereby transitioning the process phase of the image encoder from the second re-encoding process phase to a third encoding process phase.

Step S19 (Second Cycle)

The controller 101 outputs a process phase designating signal to the process phase designating signal line 134, thereby setting the switch 104 to the position 'E' to indicate that the encoding process phase resumes.

In response to the signal on the process phase designating signal line 134, the switch 104 changes the connection thereof to send the encoded data streams E3(C) supplied through the first encoded data stream signal line 113 to the selected encoded data stream signal line 114.

Step S20 (Second Cycle)

The controller 101 defaults the encoded data amount cumulative value, representing the result of accumulation of data amount of the encoded data streams output from the encoder 103, to L3(A+B) which is the re-encoded data amount cumulative value counted during the preceding second re-encoding process phase.

Step S21 (Second Cycle)

The controller 101 outputs, to the encoding parameter designating signal line 135, the scaling factor Q3, which is determined at the beginning of the preceding second re-encoding process phase, as a third scaling factor. The third scaling factor Q3 is stored together with the second scaling factor Q2 in the scaling factor register 205 in the encoder 103.

Step S22 (Second Cycle)

The controller 101 sends an encoding operation restart command signal to the encoding operation control signal line 131 to instruct the encoder 103 to resume the encoding process.

In response to the command signal, the image encoder of the present embodiment starts the third encoding process phase with a rectangular block succeeding to p2 in the relative position thereof in the source image shown in FIG. 5, namely, with a first one of the rectangular blocks constituting the segmented region C.

The orthogonal transform unit 201 in the encoder 103 performs an orthogonal transform operation on the source image data in the rectangular blocks forming the segmented region C read from the source image data buffer 102, on a block-by-block basis. A plurality of orthogonal transform coefficients of 8 rows by 8 columns obtained as a result of the operation are successively output to the transform coefficient matrix signal line 221, then to the transform coefficient matrix signal line 222 selected by the switch 202, and then successively fed to the quantizer 203.

The quantization value scaler 206 in the encoder 103 performs the scaling process on the quantization step values of 8 by 8, shown in FIG. 8, read from the quantization table 204 through the quantization step signal line 223, using each of the first scaling factor Q1, second scaling factor Q2, and third scaling factor Q3 stored in the scaling factor register 205. The scaled quantization step values of 8 rows and 8 columns scaled using the scaling factor Q1, the scaled quantization step values of 8 rows by 8 columns scaled using the scaling factor Q2, and the scaled quantization step values of 8 rows by 8 columns scaled using the scaling factor Q3 are successively fed to the quantizer 203 through the scaled quantization step signal line 225.

For example, if the scaling operation is performed on the quantization step value of 11 with the first scaling factor of 21, second scaling factor of 33 and third scaling factor of 45, each of the values 5, 7 and 10 is output as the quantization step value.

The quantizer 203 in the encoder 103 performs a quantization process on a plurality of orthogonal transform coefficient matrices of 8 rows and 8 columns supplied from the orthogonal transform unit 201 through the switch 202 and then selected transform coefficient matrix signal line 222, using elements corresponding to the quantization step value matrix of 8 by 8 which is scaled by the scaling factor Q1 and supplied from the quantization value scaler 206 through the scaled quantization step signal line 225. The quantized orthogonal transform coefficient matrices of 8 rows and 8 columns obtained as a result are successively fed to the dequantizer 207 through the quantized transform coefficient matrix signal line 226.

The dequantizer 207 in the encoder 103 performs a dequantization process on a plurality of quantized orthogonal transform coefficient matrices of 8 rows by 8 columns supplied from the quantizer 203 through the quantized transform coefficient matrix signal line 226, using the quantization step value matrix of 8 by 8 which is scaled using the scaling factor Q1 and supplied from the quantization value scaler 206 through the scaled quantization step signal line 225. The dequantized orthogonal matrices of 8 rows and 8 columns obtained as a result are successively fed to the quantizer 203 through the dequantized transform coefficient matrix signal line 227, switch 202 and then selected transform coefficient matrix signal line 222.

The quantizer 203 in the encoder 103 performs a quantization process on a plurality of quantized orthogonal transport coefficient matrices of 8 rows by 8 columns supplied from the dequantizer 207 through the switch 202, and then selected transform coefficient matrix signal line 222, using elements corresponding to the quantization step value matrix of 8 by 8 which is scaled using the scaling factor Q2 and supplied from the quantization value scaler 206 through the scaled quantization step signal line 225. The quantized orthogonal transport coefficients of 8 by 8 obtained as a result are successively fed to the dequantizer 207 again through the quantized transform coefficient matrix signal line 226.

The dequantizer 207 in the encoder 103 performs a dequantization process on a plurality of quantized orthogonal transform coefficient matrices of 8 rows by 8 columns supplied from the quantizer 203 through the quantized transform coefficient matrix signal line 226, using the quantization step value matrix of 8 by 8 which is scaled using the scaling factor Q2 and supplied from the quantization value scaler 206 through the scaled quantization step signal line 225. The dequantized orthogonal matrices of 8 rows and 8 columns obtained as a result are successively fed to the quantizer 203 again through the dequantized transform coefficient matrix signal line 227, switch 202 and then selected transform coefficient matrix signal line 222.

The quantizer 203 in the encoder 103 performs a quantization process on a plurality of orthogonal transport coefficient matrices of 8 rows by 8 columns supplied from the dequantizer 207 through the switch 202, and then selected transform coefficient matrix signal line 222, using elements corresponding to the quantization step value matrix of 8 by 8 which is scaled using the scaling factor Q3 and supplied from the quantization value scaler 206 through the scaled quantization step signal line 225. The quantized orthogonal transport coefficient matrix of 8 by 8 obtained as a result are successively fed to the entropy encoder 208 through the quantized transform coefficient matrix signal line 226.

The entropy encoder 208 in the encoder 103 performs a series of entropy encoding steps on the plurality of orthogonal transform coefficient matrices of 8 rows by 8 columns supplied from the quantizer 203 through the quantized transform coefficient matrix signal line 226. The series of entropy encoding steps include organizing two-dimensional data into one-dimensional data in accordance with a predetermined scanning order, run-length coding a non-effective transform coefficient having zero value, and variable-length coding referencing the variable-length code table 209. An encoded data stream E3(C) obtained as a result is thus output to the first encoded data stream signal line 113. The encoded data amount (associated information) counted by the encoded data counter 210 is sent to the controller 101 through the encoding process associated information notification signal line 141 for notification.

Step S7 (Third Cycle)

The data amounts of the encoded data streams E3(C) corresponding to the rectangular blocks, of which the encoder 103 successively notifies the controller 101 through the encoding process associated information notification signal line 141, are successively summed in the controller 101 as the encoded data amount cumulative value.

The encoded data streams E3(C) corresponding to individual rectangular blocks output to the first encoded data stream signal line 113 are successively transferred to the encoded data stream buffer 105 through the switch 104 and then the selected encoded data stream signal line 114 for storage in succession to the encoded data stream R3(A+B) stored during the preceding second re-encoding process phase.

The encoded data streams E3(C), which are successively stored in the encoded data stream buffer 105 during the third encoding process phase, are the ones that have been generated through the encoding process using the third scaling factor Q3. The cumulative value of the data amount of the stored encoded data stream E3(C) is summed in the controller 101. The change in the cumulative value is plotted as a straight line E3(C) in FIG. 6. The straight line E3(C) corresponds to the straight line E3(C) plotted in the graph in FIG. 4. The cumulative value of the encoded data streams R3(A+B) and encoded data stream E3(C) reaches L3(A+B+C) as early as the point of time when a relative position of the rectangular block in the source image encoded by the encoder 103 reaches 100%.

Step S8 (Third Cycle) and Step S9

After checking that the encoded data streams R3(A+B) and E3(C) corresponding to all rectangular blocks constituting the segmented region A, segmented region B, and segmented region C in the source image stored in the encoded data stream buffer 105 remains below the maximum permissible encoded data amount Llim, the controller 101 determines that the third encoding process phase currently in progress, i.e., the series of compression encoding steps on the image shown in FIG. 5 should end.

Step S23

If the controller 101 determines that the series of compression encoding steps should end, the controller 101 sends an operation end command signal to the encoding operation control signal line 131 to instruct the encoder 103 to end the block-based encoding process.

Step S24

The controller 101 notifies the external system through the compression encoding end notification signal line 122 that the series of compression encoding steps on the source image shown in FIG. 5 as the data to be encoded shown is completed.

The series of compression encoding steps discussed with reference to FIGS. 7A and 7B generate the encoded data streams, stored in the encoded data stream buffer 105, using the encoding process and re-encoding process with the scaling factor Q3 applied to the entire document (the entire page).

The series of compression encoding steps are useful in a data format, such as the JPEG, which requires that a single compression rate be commonly used to the regions in one document or one page.

The segmented region A forming the source image is subjected to the encoding process using the scaling factor Q1, and then, the re-encoding process using the scaling factor Q2, and finally to the re-encoding process using the scaling factor Q3. The encoded data stream R3(A) thus results.

The subsequent segmented region B is subjected to the encoding process using the scaling factor Q2, and finally to the re-encoding process using the scaling factor Q3. The encoded data stream R3(B) thus results.

The last segmented region C is subjected to the encoding process using the scaling factor Q3. The encoded data stream E3(C) thus results.

The three segmented regions are subjected to different number of encoding processes and re-encoding processes. The image encoder of the present invention performs required numbers of quantization and dequantization using all applicable scaling factors in the encoding operation of the remaining segmented regions, taking into consideration the segmented region A which suffers most from quantization distortion.

Specifically, the encoded data stream R3(B) is generated from the segmented region B using the local encoding and decoding processes with the scaling factor Q1, the encoding process with the scaling factor Q2, and the re-encoding process with the scaling factor Q3. The encoded data stream E3(C) is generated from the segmented region C using the local encoding and decoding processes with the scaling factor Q1, the local encoding and decoding processes with the scaling factor Q2, and the encoding process with the scaling factor Q3.

In applications where a one-page image is encoded on a substantially real-time basis (the parameter is changed in the middle of encoding of one page), all regions are regarded as encoded using the same scaling factor. The same image quality change involved in the encoding and decoding process is applied to all regions. All regions remain at the same level in quantization distortion.

Modifications

The present invention may be applied to a part of a system including a plurality of apparatuses (such as a host computer, interfaces, optical readers, and printer), or may be applied to a portion of an apparatus (such as a copying apparatus or facsimile machine).

The present invention is not limited to an apparatus and method embodying the present invention. Program codes of a software program for performing the embodiment is supplied in a computer (a CPU or an MPU) in the system or the apparatus, and the computer in the system or the apparatus drives the above-referenced units in accordance with the program codes. Such an arrangement falls within the scope of the present invention.

The program codes of the software program performs the function of the embodiment. The program codes, and means for supplying the computer with the program codes, specifically, a storage medium storing the program codes fall within the scope of the present invention.

Storage media for feeding the program code include a floppy disk, hard disk, optical disk, magneto-optical disk, CD-ROM (Compact Disk-ROM), DVD (Digital Versatile Disk), magnetic tape, nonvolatile memory card, ROM (Read-Only Memory), etc.

The function of the embodiment is performed by the computer which controls a variety of devices in accordance with the supplied program codes only. Furthermore, the function of the embodiment is performed when the program code works in cooperation with an OS (operating system) or another application software program running on the computer. The program codes also fall within the scope of the present invention.

The program codes are stored in a memory in a feature expansion board or a feature expansion unit connected to the computer. A CPU mounted on the feature expansion board or the feature expansion unit performs partly or entirely the actual process in response to the instruction from the program codes. The function of the embodiment is thus performed through the process. Such an arrangement falls within the scope of the present invention.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image encoder comprising:

encoding means which encodes source image data using an encoding parameter to generate first encoded data;

re-encoding means which re-encodes the first encoded data using a re-encoding parameter to generate second encoded data;

parameter updating means which calculates a new parameter for the encoding means and feeds the new encoding parameter to the encoding means when a sum of a data amount of the first encoded data and a data amount of the second encoded data reaches a target amount; and control means which feeds a re-encoding parameter to the re-encoding means to start a re-encoding process when the sum of data amount reaches the target amount, wherein the encoding means performs an encoding process using the encoding parameter at the beginning of encoding the source image data and all subsequent encoding parameters which are updated versions of the encoding parameter.

2. A method for encoding an image, the method comprising the steps of:

encoding source image data using an encoding parameter to generate first encoded data;

re-encoding the first encoded data using a re-encoding parameter to generate second encoded data;

updating the parameter by calculating a new parameter for the encoding step and by feeding the new encoding parameter in the encoding step when a sum of a data amount of the first encoded data and a data amount of the second encoded data reaches a target amount; and controlling the feeding of the re-encoding parameter in the re-encoding step to start a re-encoding process when the sum of data amount reaches the target amount, wherein in the encoding step; an encoding process is performed using the encoding parameter at the beginning of encoding the source image data and all subsequent encoding parameters which are updated versions of the encoding parameter.

3. A storage medium storing a computer readable program for encoding an image, the computer readable program comprising program codes for performing the steps of:

encoding source image data using an encoding parameter to generate first encoded data;

re-encoding the first encoded data using a re-encoding parameter to generate second encoded data;

updating the parameter by calculating a new parameter for the encoding step and by feeding the new encoding parameter in the encoding step when a sum of a data amount of the first encoded data and a data amount of the second encoded data reaches a target amount; and controlling the feeding of the re-encoding parameter in the re-encoding step to start a re-encoding process when the sum of data amount reaches the target amount, wherein in the encoding step, an encoding process is performed using the encoding parameter at the beginning of encoding the source image data and all subsequent encoding parameters which are updated versions of the encoding parameter.

4. A method for encoding image data representing an image to obtain encoded data having a target amount, the method comprising the steps of:

(a) inputting the image data, representing the image;

(b) segmenting the input image data into a plurality of pieces of block image data;

(c) encoding successively the block image data using an encoding parameter $Q_X$ to generate first encoded data; and (d) updating the encoding parameter $Q_X$ to a new encoding parameter $Q_{X+1}$ if the first encoded data exceeds a predetermined amount, then followed by the steps of:

(e) re-encoding the first encoded data using the encoding parameter $Q_X$ to convert the first encoded data into second encoded data; and (f) encoding successively still unencoded block image data using the encoding parameter $Q_X$ to generate third encoded data, wherein all types of encoding parameters $Q_X$ used in steps (c) and (e) are used in the encoding process of the encoding step (f).

5. An image encoder for encoding image data representing an image to obtain encoded data having a target amount, the image encoder comprising:

(a) input means for inputting the image data representing the image;

(b) segmenting means for segmenting the input image data into a plurality of pieces of block image data;

(c) encoding means for successively encoding the block image data using an encoding parameter $Q_X$ to generate first encoded data;

(d) re-encoding means for re-encoding the encoded data to convert the encoded data into re-encoded data; and (e) monitoring means for monitoring a data amount of encoded data obtained by the encoding means and re-encoding means, wherein (f) when the first encoded data exceeds a predetermined amount, the encoding parameter $Q_X$ is updated to a new encoding parameter $Q_{X+1}$ and is then followed by:

(g) the re-encoding means re-encodes the first encoded data using the encoding parameter $Q_X$ to convert the first encoded data into second encoded data, and (h) the encoding means successively encodes still uncoded block image data using the encoding parameter $Q_X$ to generate third encoded data, and wherein all types of encoding parameters $Q_X$ used by the encoding means in the preceding steps are used by the encoding means in the encoding step (h).

6. A storage medium storing a computer readable program for encoding image data representing an image to obtain encoded data having a target amount, the computer readable program comprising program codes for performing the steps of:

(a) inputting the image data representing the image;

(b) segmenting the input image data into a plurality of pieces of block image data;

(c) encoding successively the block image data using an encoding parameter $Q_X$ to generate first encoded data; and (d) updating the encoding parameter $Q_X$ to a new encoding parameter $Q_{X+1}$ if the first encoded data exceeds a predetermined amount, then followed by the steps of:

(e) re-encoding the first encoded data using the encoding parameter $Q_X$ to convert the first encoded data into second encoded data; and (f) encoding successively still unencoded block image data using the encoding parameter $Q_X$ to generate third encoded data, wherein all types of encoding parameters $Q_X$ used in steps (c) and (e) are used in the encoding process of the encoding step (f).

7. A method for encoding image data representing an image to obtain encoded data having a target amount, the method comprising the steps of:

(a) inputting the image data representing the image;

(b) segmenting the input image data into a plurality of pieces of block image data;

(c) encoding successively the block image data using an encoding parameter $Q_X$ to generate first encoded data;

(d) updating the encoding parameter $Q_X$ to a new encoding parameter $Q_{X+1}$ when the first encoded data exceeds a predetermined amount, then followed by the steps of:

(e) re-encoding the first encoded data using the encoding parameter $Q_X$ to convert the first encoded data into second encoded data;

(f) encoding successively still unencoded block image data using the encoding parameter $Q_X$ to generate third encoded data; and (g) updating the encoding parameter $Q_{X+1}$ to a new encoding parameter $Q_{X+2}$ if a sum of a data amount of the second encoded data and a data amount of the third encoded data reaches a target amount, then followed by the steps of:

(h) re-encoding the second encoded data using the encoding parameter $Q_X$ to convert the second encoded data into fourth encoded data;

(i) re-encoding the third encoded data using the encoding parameter $Q_X$ to convert the third encode data into fifth encoded data; and (j) encoding successively still unencoded block image data using the encoding parameter $Q_X$ to generate sixth encoded data, wherein all types of encoding parameters % used in steps (c) and (e) are used in the encoding step (f), and wherein all types of encoding parameters $Q_X$ used in steps (c), (e), and (h) are used in the encoding step (j).

8. A method according to claim 7, further comprising repeating steps (g) through (j).

9. A method according to claim 7, wherein each of steps (c), (f), and (j) performs a JPEG compression, and wherein the encoding parameters $Q_X$ comprises a quantization parameter.

10. A method according to claim 7, the block image data comprises image data representing 8 by 8 pixels.

11. An image encoder for encoding image data representing an image to obtain encoded data having a target amount, the image encoder comprising:

(a) input means for inputting the image data representing the image;

(b) segmenting means for segmenting the input image data into a plurality of pieces of block image data;

(c) encoding means for encoding successively the block image data using an encoding parameter $Q_X$ to generate first encoded data;

(d) re-encoding means for re-encoding encoded data to convert the encoded data into re-encoded data;

(e) monitoring means for monitoring the encoded data obtained by the encoding means and the re-encoding means;

wherein (f) the encoding parameter $Q_X$ is updated to the encoding parameter $Q_{X+1}$ if the first encoding data exceeds a predetermined amount, then, (g) the re-encoding means re-encodes the first encoded data using the encoding parameter $Q_X$ to convert the first encoded data into second encoded data, and (h) the encoding means successively encodes still unencoded block image data using the encoding parameter $Q_X$ to generate third encoded data, and wherein (i) the encoding parameter $Q_{X+1}$ is updated to a new encoding parameter $Q_{X+2}$ if a sum of a data amount of the second encoded data and a data amount of the third encoded data reaches a target amount, then, (j) the re-encoding means re-encodes the second encoded data using the encoding parameter $Q_X$ to convert the second encoded data into fourth encoded data, (k) the re-encoding means re-encodes the third encoded data using the encoding parameter $Q_X$ to convert the third encode data into fifth encoded data, and (l) the encoding means successively encodes still unencoded block image data using the encoding parameter $Q_X$ to generate sixth encoded data, and wherein all types of encoding parameters $Q_X$ used by the encoding means are used by the encoding means in steps (h) and (l).

12. A storage medium storing a computer readable program for encoding image data representing an image to obtain encoded data having a target amount, the computer readable program comprising program codes for performing the steps of:

(a) inputting the image data representing the image;

(b) segmenting the input image data into a plurality of pieces of block image data;

(c) encoding successively the block image data using an encoding parameter $Q_X$ to generate first encoded data;

(d) updating the encoding parameter $Q_X$ to a new encoding parameter $Q_{X+1}$ when the first encoded data exceeds a predetermined amount, then followed by the steps of:

(e) re-encoding the first encoded data using the encoding parameter $Q_X$ to convert the first encoded data into second encoded data;

(f) encoding successively still unencoded block image data using the encoding parameter $Q_X$ to generate third encoded data; and (g) updating the encoding parameter $Q_{X+1}$ to a new encoding parameter $Q_{X+2}$ if a sum of a data amount of the second encoded data and a data amount of the third encoded data reaches a target amount, then followed by the steps of:

(h) re-encoding the second encoded data using the encoding parameter $Q_X$ to convert the second encoded data into fourth encoded data;

(i) re-encoding the third encoded data using the encoding parameter $Q_X$ to convert the third encode data into fifth encoded data; and (j) encoding successively still unencoded block image data using the encoding parameter $Q_X$ to generate sixth encoded data, wherein all types of encoding parameters $Q_X$ used in steps (c) and (e) are used in the encoding step (f), and wherein all types of encoding parameters $Q_X$ used in steps (c), (e), and (h), are used in the encoding step (j).

* * * * *

UNITED STATES PATENT AND TRADEMARK OFFICE
CERTIFICATE OF CORRECTION

| | | |
|---|---|---|
| PATENT NO. | : 7,136,531 B2 | |
| APPLICATION NO. | : 10/409154 | |
| DATED | : November 14, 2006 | |
| INVENTOR(S) | : Makoto Satoh | |

It is certified that error appears in the above-identified patent and that said Letters Patent is hereby corrected as shown below:

SHEET 4:

Fig. 4, "RECTANGULER" should read --RECTANGULAR--.

COLUMN 2:

Line 4, "feed-back" should read --feedback--.

COLUMN 3:

Line 9, "an" (second occurrence) should read --a--;
    Line 18, "feed-back" should read --feedback--; and
    Line 45, "feed-back" should read --feedback--.

COLUMN 4:

Line 35, "invention" should read --invention to--.

COLUMN 5:

Line 43, "divided" should read --divided into--.

COLUMN 7:

Line 22, "pate" should read --page--.

COLUMN 9:

Line 62, "encoding)." should read --encoding.)--.

COLUMN 10:

Line 16, "26" should be deleted.

COLUMN 13:

Line 43, "reaches" should read --reach--.

UNITED STATES PATENT AND TRADEMARK OFFICE
CERTIFICATE OF CORRECTION

PATENT NO. : 7,136,531 B2
APPLICATION NO. : 10/409154
DATED : November 14, 2006
INVENTOR(S) : Makoto Satoh It is certified that error appears in the above-identified patent and that said Letters Patent is hereby corrected as shown below:

COLUMN 14:

Line 18, "L3(A+B+C)>L4(A+B+C)" should read
--L3(A+B+C)≥L4(A+B+C)--; and
Line 34, "steam," should read --stream,--.

COLUMN 15:

Line 20, "perform" should read --performs--.

COLUMN 18:

Line 60, "perform" should read --performs--.

COLUMN 21:

Line 31, "perform" should read --performs--.

COLUMN 24:

Line 12, "perform" should read --performs--.

COLUMN 28:

Line 12, "performs" should read --perform--.

COLUMN 29:

Line 19, "step;" should read --step,--; and
Line 49, "data," should read --data--.

COLUMN 31:

Line 18, "parameters %" should read --parameters Qx--;
Line 26, "Comprises" should read --Comprise--;
Line 46, "encoding" (second occurrence) should read --encoded--; and
Line 53, "and" should read --and ¶--.

UNITED STATES PATENT AND TRADEMARK OFFICE
CERTIFICATE OF CORRECTION

PATENT NO. : 7,136,531 B2
APPLICATION NO. : 10/409154
DATED : November 14, 2006
INVENTOR(S) : Makoto Satoh It is certified that error appears in the above-identified patent and that said Letters Patent is hereby corrected as shown below:

<u>COLUMN 32</u>:

Line 9, "encode" should read --encoded--;
    Line 44, "encode" should read --encoded--; and
    Line 52, "(h), are" should read --(h) are--.

Signed and Sealed this

Third Day of July, 2007

JON W. DUDAS
*Director of the United States Patent and Trademark Office*